US012774825B2

(12) United States Patent
Malkawi

(10) Patent No.: US 12,774,825 B2
(45) Date of Patent: Oct. 27, 2026

(54) BUILDING AS AN INSTRUMENTATION FOR DATA-DRIVEN BUILDING OPERATION

(71) Applicant: President and Fellows of Harvard College, Cambridge, MA (US)

(72) Inventor: Ali Malkawi, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 18/267,021

(22) PCT Filed: Jun. 12, 2023

(86) PCT No.: PCT/US2023/068303
§ 371 (c)(1),
(2) Date: Jun. 13, 2023

(87) PCT Pub. No.: WO2023/244978
PCT Pub. Date: Dec. 21, 2023

(65) Prior Publication Data

US 2025/0102177 A1 Mar. 27, 2025

Related U.S. Application Data

(60) Provisional application No. 63/501,262, filed on May 10, 2023, provisional application No. 63/500,517,
(Continued)

(51) Int. Cl.
*F24F 11/63* (2018.01)
*F24F 11/46* (2018.01)
(Continued)

(52) U.S. Cl.
CPC .............. *F24F 11/63* (2018.01); *F24F 11/46* (2018.01); *F24F 11/58* (2018.01); *F24F 11/74* (2018.01);
(Continued)

(58) Field of Classification Search
CPC .. F24F 11/58; F24F 11/63; F24F 11/46; F24F 11/74; H04L 12/4641; H04L 63/0272; H04L 67/125
(Continued)

(56) References Cited

U.S. PATENT DOCUMENTS 9,274,520 B2 * 3/2016 Ali ........................ G01M 15/14
10,690,372 B2 * 6/2020 Arens ..................... F24F 13/32
(Continued)

FOREIGN PATENT DOCUMENTS

CN 102857363 B * 4/2016 ............. H04L 41/00
CN 109612029 A * 4/2019 ............... G01F 1/00
(Continued)

OTHER PUBLICATIONS

International Search Report and Written Opinion for related International Application No. PCT/US2023/068303, dated Oct. 4, 2023, 20 pages.

*Primary Examiner* — Crystal J Barnes-Bullock
(74) *Attorney, Agent, or Firm* — Morgan, Lewis & Bockius LLP

(57) ABSTRACT

There is provided a system for environmental control in a building. The system includes a plurality of sensors including operational sensors and data gathering sensors, and a plurality of actuators. The system also includes a rule-based server and a data-driven server coupled to the plurality of sensors and the plurality of actuators. The rule-based server receives operation signals from the operational sensors, and control operation of the plurality of actuators according to one or more rules based on the operation signals. The data-driven server receives or monitors data signals from the data-gathering sensors and the operation signals from the operational sensors, trains and/or applies data-driven models to the data signals and the operation signals to predict performance changes in the building due to a command. In
(Continued)

accordance with a determination that the performance changes meet a predetermined criteria, the data-driven server controls operations of the plurality of actuators according to the command.

19 Claims, 16 Drawing Sheets

Related U.S. Application Data filed on May 5, 2023, provisional application No. 63/352,076, filed on Jun. 14, 2022.

(51) Int. Cl.

| | |
|---|---|
| ***F24F 11/58*** | (2018.01) |
| ***F24F 11/74*** | (2018.01) |
| ***H04L 9/40*** | (2022.01) |
| ***H04L 12/46*** | (2006.01) |
| ***H04L 67/125*** | (2022.01) |

(52) U.S. Cl.
CPC ...... *H04L 12/4641* (2013.01); *H04L 63/0272* (2013.01); *H04L 67/125* (2013.01)

(58) Field of Classification Search
USPC .......................................................... 700/276
See application file for complete search history.

(56) References Cited

U.S. PATENT DOCUMENTS

| | | | | |
|---|---|---|---|---|
| 10,840,735 | B1 | 11/2020 | Cooper | |
| 11,018,889 | B2 * | 5/2021 | Park | H04L 12/2812 |
| 11,639,804 | B2 * | 5/2023 | Vause | F24F 11/56 700/276 |
| 11,995,736 | B2 * | 5/2024 | Jeong | G06Q 90/205 |
| 2009/0322742 | A1 | 12/2009 | Muktinutalapati et al. | |
| 2015/0019024 | A1 | 1/2015 | Sabripour | |
| 2015/0277699 | A1 | 10/2015 | Algreatly | |
| 2016/0120058 | A1 | 4/2016 | Shedd et al. | |
| 2016/0201934 | A1 | 7/2016 | Hester et al. | |
| 2017/0045548 | A1 | 2/2017 | Booij et al. | |
| 2020/0064153 | A1 | 2/2020 | Kagan et al. | |
| 2020/0304332 | A1 | 9/2020 | Park et al. | |
| 2021/0063041 | A1 | 3/2021 | Lupien et al. | |
| 2021/0180820 | A1 | 6/2021 | Vause | |
| 2023/0145066 | A1 * | 5/2023 | Jeong | G01C 21/3697 705/324 |
| 2025/0102177 | A1 * | 3/2025 | Malkawi | H04L 12/4641 |

FOREIGN PATENT DOCUMENTS

| | | | | | |
|---|---|---|---|---|---|
| CN | 118361842 | A | * | 7/2024 | F24F 11/64 |
| JP | 5262682 | B2 | * | 8/2013 | |
| KR | 102346657 | B1 | * | 1/2022 | F24F 11/66 |

* cited by examiner

1100

1300

(a) (b) (c) (d)

BUILDING AS AN INSTRUMENTATION FOR DATA-DRIVEN BUILDING OPERATION

CROSS-REFERENCE TO RELATED APPLICATIONS

This application is a U.S. National Phase of International Patent Application No. PCT/US2023/068303 filed Jun. 12, 2023, which claims the benefit of U.S. Provisional Patent Application No. 63/352,076 filed Jun. 14, 2022, U.S. Provisional Patent Application No. 63/500,517 filed May 5, 2023, and U.S. Provisional Patent Application No. 63/501,262 filed May 10, 2023, each of which is incorporated by reference herein in its entirety.

TECHNICAL FIELD

This application relates generally to Internet of Things ("IoT") architectures, and more specifically to the use of an IoT architecture for energy efficient indoor climate control.

BACKGROUND

The building sector accounts for approximately 40% of total global energy consumption, which suggests a great potential for reduction in energy and carbon emissions through improving building operation efficiency. The concepts of an ultra-low energy building and a zero energy building have been proposed, which may integrate multiple advanced low-energy building systems and passive technologies. However, such systems often face challenges in their control. For example, it is complicated to control mixed mode ventilation in a building because of the complexity of the hybrid mechanical ventilation, natural ventilation systems, and coupled indoor and outdoor air flows and disturbances. Integration of such systems, such as natural ventilation coupled with thermally active building systems (TABS), may also bring additional challenges to coordinated control of different systems to maximize their operational performance. IoT architectures seamlessly connect Operations Technology ("OT") elements, such as sensors, actuators, and controllers, with Information technology ("IT") including digital networks and algorithms. The advent of IoT shows great potential to achieve the coordinated optimal operation of low energy 'smart' buildings.

Conventional systems that use IoT architectures for climate control in buildings have several limitations. For example, current systems do not use IoT architecture for integrated low-energy building systems (e.g., geothermal assisted TABS coupled with natural ventilation). Also, traditional systems do not allow experimentation in smart building operation, which is important for testing and demonstrating new algorithms and technologies. Furthermore, most conventional systems target a specific application, such as control or fault detection, and fail to provide a comprehensive capability of applications based on IoT architecture.

SUMMARY

Accordingly, there is a need for systems and architectures that address at least some of the limitations described above. Described herein is a design of an IoT architecture that may allow data-driven operations and experimentation in an ultra-efficient office building. Unlike conventional systems, the IoT architecture described herein may include two systems: one system for "operation" and another "research" system for data acquisition, management, and separate commanding mechanisms. This may allow researchers to study and test learning algorithms in the building with one single zone, multiple zones, or the entire building. Integrated with multiple low-energy technologies, the studied building may also serve as a prototype for ultra-efficiency with IoT-enabled smart building architecture. In addition to the design of the IoT architecture, also described herein are various applications demonstrated in the developed IoT architecture.

The disclosed implementations provide a system for environmental control in a building. In some embodiments, the system may include a plurality of sensors including operational sensors and data gathering sensors, and a plurality of actuators. The system may also include a rule-based server and a data-driven server, coupled to the plurality of sensors and the plurality of actuators. The rule-based server may be configured to receive operation signals from the operational sensors, and control operation of the plurality of actuators according to one or more rules based on the operation signals. The data-driven server may be configured to receive data signals from the data-gathering sensors and the operation signals from the operational sensors, apply one or more predictive models to the data signals and the operation signals to predict performance changes in the building due to a command, and/or in accordance with a determination that the performance changes meet a predetermined criteria, control operations of the plurality of actuators according to the command.

In some embodiments, the data-driven server and the rule-based server may be configured to control operation of the plurality of actuators concurrently during a first time period, and the data-driven server may be configured to control operation of the plurality of actuators exclusively during a second time period.

In some embodiments, the rule-based server may be configured to cease operating or to cease controlling operation of the plurality of actuators after a predetermined time period (e.g., during a second time period).

In some embodiments, the data-driven server is configured to control operation of a subset of the plurality of actuators for a zone of the building, multiple zones of the building, or the entire building, for a first time period, along with the rule-based server. The subset may include the whole of the plurality of actuators. The data-driven server may be configured to control operation of the subset of the plurality of actuators for the zone of the building or multiple zones of the building or the entire building exclusively during a second time period.

In some embodiments, the data-driven server may be configured to: retrieve data points in real-time or historical trends from the data signals, the operation signals, and/or control signals; use a machine learning model (e.g., Long-Short-Term Memory (LSTM) deep learning model) for identifying thermal dynamics and CO2 trends, based on the data points; and apply a multi-objective optimization function that optimizes indoor air quality, thermal comfort, and energy efficiency for the building, based on the thermal dynamics and CO2 trends, to predict the performance changes in the building due to the command.

In some embodiments, the data-driven server may be configured to determine if the performance changes meet the predetermined criteria by (i) simulating issuing the command to control operations of the plurality of actuators using a virtual model of the building and/or (ii) issuing the command to control operations of a portion of the building.

In some embodiments, the virtual model may include buildings that are of different types and/or have different locations compared to the building.

In some embodiments, the rule-based server and the data-driven server are different. In some embodiments, the rule-based server and the data-driven server are identical.

In some embodiments, the system may further include a building monitoring and visualization server (e.g., a building monitoring database and visualization device) configured to monitor and visualize performance of the building.

In some embodiments, the rule-based server and the data-driven server may be configured on one or more restricted access secure virtual local area networks (VLANs) to prevent access from outside the building.

In some embodiments, the rule-based server and the operational sensors may be configured to communicate via a first network. The data-driven server and the data gathering sensors may be configured to communicate via a second network that is separate and distinct from the first network.

In some embodiments, the first network and the second network may be networks based on serial protocols that allow daisy-chaining of devices.

In some embodiments, the first network is a Konnex (KNX) network and the second network is a BACnet network.

In some embodiments, the first network and the second network may be connected via one or more gateways.

In some embodiments, the operational sensors may include sensors for indoor slab and air temperatures, local zone thermostats, CO2 sensors to evaluate occupancy, and/or one or more local weather station sensors for outdoor temperature and/or rain.

In some embodiments, the plurality of sensors may include at least some sensors that acquire signals at different frequencies and intervals than other sensors.

In some embodiments, the rule-based server may be configured to control heating and cooling operation of a geothermal heat-pump, motorized windows, and/or solar thermal vent of the building.

In some embodiments, the rule-based server may be configured to control actuation of motorized windows based on CO2, occupancy sensors, and/or heating or cooling from a geothermal heat pump based on zone thermostats.

In some embodiments, the data-driven server may be configured to monitor the plurality of sensors, control one or more actuators of the plurality of actuators, store sensor data from the plurality of sensors for analysis, command heating and cooling, and/or connect to one or more external building automation systems.

In some embodiments, the data gathering sensors may include finer-grained sensors than the operational sensors and more extensive set of sensors, including both low-height (below the knee) and high-height (above the head) temperature sensors, configured to detect stratification in various spaces, and/or low-velocity air-motion sensors configured to detect air movement and buoyancy-effect drafts throughout structure of the building as well as calibrate simulation measurements.

In some embodiments, the data gathering sensors may include BTU-sensors attached to several heating zones, tubing, manifolds, and valves to monitor distribution of heat along with fluid flows and temperatures.

In some embodiments, each electrical circuit in the structure may be independently metered, as is each solar panel, to measure its energy usage over time.

In some embodiments, the data gathering sensors may further include a redundant whole-house energy usage meter configured to monitor an aggregate of individual energy readings.

In some embodiments, the system may further include an augmented reality headset configured to show information from at least one of the plurality of sensors, while a wearer of the augmented reality headset visually observes the inside of the building.

In some embodiments, the augmented reality headset may be further configured to allow the wearer to issue a command for controlling at least one of the plurality of actuators.

In another aspect, a system for environmental control in a building is provided herein, according to some embodiments. The system includes an operations subsystem and an data analysis subsystem. The operations subsystem may include a plurality of operations environmental sensors configured to measure climate-related statistics inside or proximate to the building, a plurality of environmental actuators, and an operations server. The operations server may be operatively coupled to the plurality of environmental actuators, and configured to transmit commands to any of the plurality of environmental actuators to change a climate condition in the building. The commands are issued in accordance with at least one rule. The data analysis subsystem may include a plurality of data analysis environmental sensors configured to measure climate-related statistics inside or proximate to the building, and a data analysis server communicatively coupled to the plurality of data analysis environmental sensors and the operations server. The data analysis server may be configured to: monitor readings from the plurality of operations environmental sensors and from the plurality of data analysis environmental sensors; transmit a command to the operations server to change a setting on one of the plurality of environmental actuators, the setting relating to a climate condition in the building; gather data from a portion of the plurality of operations environmental sensors or a portion of the plurality of data analysis environmental sensors, to determine a climate effect and an energy usage effect, in the building, after sending the command; and use the climate effect, the energy usage effect, and the command to generate or train a data driven model for generating future commands to change future settings on the plurality of environmental actuators.

In some embodiments, the command is a first command, and the data analysis subsystem may further include a plurality of data analysis environmental actuators, coupled to the data analysis server and confined to a separate section of the building. The data analysis server may be further configured to: transmit a second command to one of the plurality of data analysis environmental actuators, effective to modify a setting relating to at least one of the second plurality of environmental actuators; gather data from at least one of the second plurality of environmental sensors that is present in the separate section of the building; determine a second climate effect on the separate section of the building, caused by the second command; and use the second climate effect, and the second command to generate or train the data driven model.

In some embodiments, the operations subsystem may further include an operations network, wherein the operations network uses a Konnex (KNX) network protocol.

In some embodiments, the data analysis subsystem may further include a data analysis network, wherein the data analysis network uses a building automation and control network (BACnet) protocol.

In some embodiments, the operations network and the data analysis network may be configured to communicate via a gateway, and the gateway may be configured to translate between the KNX protocol and the BACnet protocol.

In some embodiments, the data analysis server may be configured to receive a measurement from at least one of the plurality of operations environmental sensors or from at least one of the plurality of data analysis environmental sensors, every sixty seconds.

In some embodiments, the system may include an augmented reality headset configured to show information from at least one of the plurality of operations environmental sensors, or from at least one of the plurality of data analysis environmental sensors, while a wearer of the augmented reality headset visually observes the inside of the building.

In some embodiments, the data driven model may include a geometric model of the building.

In another aspect, a method is provide for environmental control in a building, according to some embodiments. The method may include, at a rule-based server coupled to a plurality of sensors and a plurality of actuators: receiving operation signals from operational sensors of the plurality of sensors; and controlling operation of the plurality of actuators according to one or more rules based on the operation signals. The method also includes, performing at a data-driven server coupled to the plurality of sensors and the plurality of actuators: receiving data signals from data gathering sensors of the plurality of sensors and the operation signals from the operational sensors; applying one or more predictive models to the data signals and the operation signals to predict performance changes in the building due to a command; and/or in accordance with a determination that the performance changes meet a predetermined criteria, controlling operations of the plurality of actuators according to the command.

In some embodiments, the method may include, at the data-driven server and the rule-based server, during a first time period, concurrently controlling operation of the plurality of actuators; and at the data-driven server, during a second time period, exclusively controlling operation of the plurality of actuators.

In some embodiments, the method may include, at the rule-based server, ceasing operating or ceasing controlling operation of the plurality of actuators after a predetermined time period.

In some embodiments, the method may include, at the data-driven server and the rule-based server, controlling operation of a subset of the plurality of actuators for a zone of the building, multiple zones of the building, or the entire building, for a first time period. The method may also include, at the data-driven server, controlling operation of the subset of the plurality of actuators for the zone of the building or multiple zones of the building or the entire building exclusively during a second time period.

In some embodiments, the method may include, at the data-driven server: retrieving data points in real-time or historical trends from the data signals, the operation signals, and/or control signals; using a machine learning model for identifying thermal dynamics and CO2 trends, based on the data points; and/or applying a multi-objective optimization function that optimizes indoor air quality, thermal comfort, and energy efficiency for the building, based on the thermal dynamics and CO2 trends, to predict the performance changes in the building due to the command.

In some embodiments, the method may further include, at the data-driven server: determining if the performance changes meet the predetermined criteria by (i) simulating issuing the command to control operations of the plurality of actuators using a virtual model of the building and/or (ii) issuing the command to control operations of a portion of the building.

In some embodiments, the virtual model may include buildings that are of different types and/or have different locations compared to the building.

In some embodiments, the method may further include, at a building monitoring database and visualization device, monitoring and visualizing performance of the building.

In some embodiments, the rule-based server and the data-driven server may be configured on one or more restricted access secure virtual local area networks (VLANs) to prevent access from outside the building.

In some embodiments, the rule-based server and the operational sensors may communicate via a first network, and the data-driven server and the data gathering sensors may communicate via a second network that is separate and distinct from the first network.

In some embodiments, the first network may be a Konnex (KNX) network and the second network may be a BACnet network.

In some embodiments, the operational sensors include sensors for indoor slab and air temperatures, local zone thermostats, CO2 sensors to evaluate occupancy, and/or one or more local weather station sensors for outdoor temperature and/or rain.

In some embodiments, the plurality of sensors may include at least some sensors that acquire signals at different frequencies and intervals than other sensors.

In some embodiments, the method includes, at the data-driven server, monitoring the plurality of sensors, controlling one or more actuators of the plurality of actuators, storing sensor data from the plurality of sensors for analysis, commanding heating and cooling, and/or connecting to one or more external building automation systems.

In some embodiments, the data gathering sensors may include finer-grained sensors and a more extensive set of sensors than the operational sensors, including both low-height and high-height temperature sensors, and low-velocity air-motion sensors. The method may include, at the low-height and high-height temperature sensors, detecting stratification in various spaces; and at the low-velocity air-motion sensors, detecting air movement and buoyancy-effect drafts throughout structure of the building as well as calibrate simulation measurements.

In some embodiments, the data gathering sensors may include BTU-sensors attached to several heating zones, tubing, manifolds, and valves to monitor distribution of heat along with fluid flows and temperatures.

In some embodiments, each electrical circuit in the structure may be independently metered, as is each solar panel, to measure its energy usage over time.

In some embodiments, the data gathering sensors may further include a redundant whole-house energy usage meter. The method may further include, at the redundant whole-house energy usage meter, monitoring an aggregate of individual energy readings.

In some embodiments, the method may further include, at an augmented reality headset, showing information from at least one of the plurality of sensors, while a wearer of the augmented reality headset visually observes an inside of the building.

In some embodiments, the method may further include, at the augmented reality headset, allowing the wearer to issue a hand gesture command for controlling at least one of the plurality of actuators.

In another aspect, a method is provided for environmental control in a building, according to some embodiments. The method may include, at an operations subsystem: at a plurality of operations environmental sensors, measuring climate-related statistics inside or proximate to the building; and at an operations server, operatively coupled to a plurality of environmental actuators, and/or transmitting commands to any of the plurality of environmental actuators to change a climate condition in the building. The commands may be issued in accordance with at least one rule. The method may also include performing at a data analysis subsystem: at a plurality of data analysis environmental sensors, measuring climate-related statistics inside or proximate to the building; and/or performing at a data analysis server communicatively coupled to the plurality of data analysis environmental sensors and the operations server: monitoring readings from the plurality of operations environmental sensors and the plurality of data analysis environmental sensors; transmitting a command to the operations server to change a setting on one of the plurality of environmental actuators, the setting relating to a climate condition in the building; gathering data from a portion of the plurality of operations environmental sensors or a portion of the plurality of data analysis environmental sensors, to determine a climate effect and an energy usage effect, in the building, after sending the command; and/or using the climate effect, the energy usage effect, and the command to generate or train a data driven model for generating future commands to change future settings on the plurality of environmental actuators.

In some embodiments, the command may be a first command, and the data analysis subsystem may further include a plurality of data analysis environmental actuators, coupled to the data analysis server and confined to a separate section of the building. The method may further include, at the data analysis server: transmitting a second command to one of the plurality of data analysis environmental actuators, effective to modify a setting relating to at least one of the plurality of data analysis environmental actuators; gathering data from at least one of the plurality of data analysis environmental sensors that is present in the separate section of the building; determining a second climate effect on the separate section of the building, caused by the second command; and/or using the second climate effect, and the second command to generate or train the data driven model.

In some embodiments, the operations subsystem may further include an operations network, the operations network may use a KNX protocol.

In some embodiments, the data analysis subsystem may further include a data analysis network. The data analysis network may use a building automation and control network (BACnet) protocol.

In some embodiments, the operations network and the data analysis network may communicate via a gateway, and the gateway may translate between the KNX protocol and the BACnet protocol.

In some embodiments, the data analysis server may receive a measurement from at least one of the plurality of operations environmental sensors or from at least one of the plurality of data analysis environmental sensors, every sixty seconds.

In some embodiments, the method may further include, at an augmented reality headset, showing information from at least one of the plurality of operations environmental sensors, or from at least one of the plurality of data analysis environmental sensors, while a wearer of the augmented reality headset visually observes an inside of the building.

In some embodiments, the data driven model may include a geometric model of the building.

In another aspect, an electronic device includes one or more processors, memory, a display, and one or more programs stored in the memory. The programs are configured for execution by the one or more processors and are configured to perform any of the methods described herein.

In another aspect, a non-transitory computer readable storage medium stores one or more programs configured for execution by a computing device having one or more processors, memory, and a display. The one or more programs are configured to perform any of the methods described herein.

Thus methods, systems, and architectures are disclosed that provide effective environmental control in buildings.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

DETAILED DESCRIPTION

Figure 1:
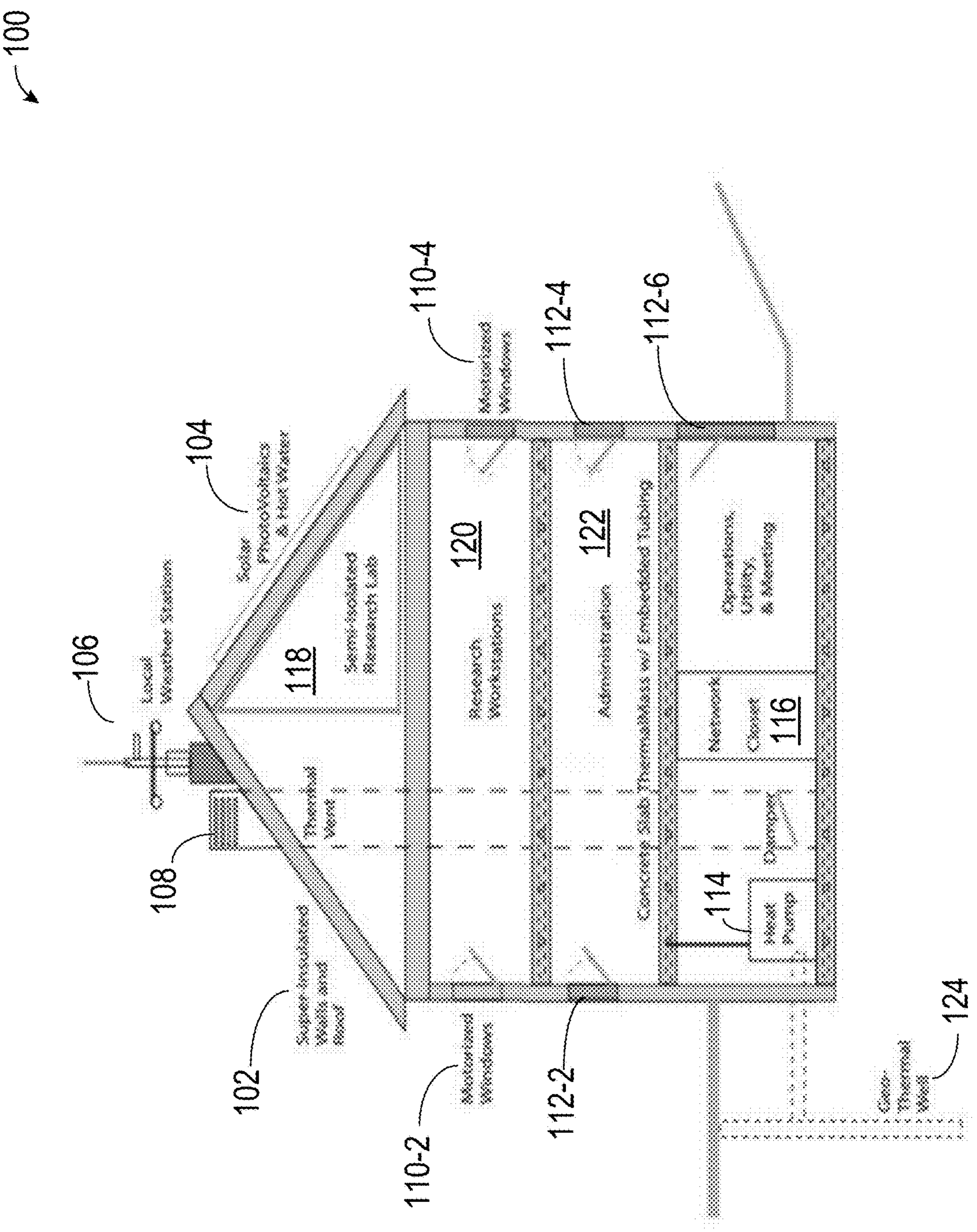
FIG. 1 is a schematic diagram of an example building, in accordance with one aspect of the present disclosure.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

The disclosure herein relates to an Internet of Things (IoT) architecture that allows data-driven operations and experimentation for an ultra-efficient office building. To develop the data-driven control for future building operations, a building, e.g. a laboratory building, may include two systems: one system for "operation" and another "research" or "data analysis" (sometimes referred to as data-driven) system, to allow data acquisition, management, and separate commanding mechanisms. To support this dual operation, an extensive network that allows data-driven control and experimentation in a real environment is herein disclosed. The IoT architecture herein disclosed may include the communication network, sensor network, building operations, and research network, as well as a hybrid physical and virtual testbed. The lab building may include multiple heating/cooling zones that can be controlled and commanded individually. To deploy experimental control algorithms and commands using the building real-time and historical data, a third independent system may also be used. The independent system may allow third party developers/researchers to securely acquire real-time and historical data from the research system, and to deploy a commanding/control data driven software/algorithms and control spaces within the building. A hybrid physical and virtual testbed may also be used, which may include a validated physics-based digital twin virtual testbed, to support algorithm testing before it is deployed in a 'Live Lab' physical testbed. The testbed may include a part of the building for experimental testing. Several applications may utilize this architecture. An experiment that illustrates the development of a data-driven algorithm and its testing and deployment using the hybrid physical and virtual testbed is disclosed. A data-informed building energy management based on the IoT architecture is also disclosed. Augmented reality-based building operations and facility management is also disclosed.

IoT architecture, as used for climate control in a building, may be described with three layers, which include the perception layer, network layer, and application layer. The perception layer may be designed for data collection through sensing technologies. This usually includes wireless sensor networks, video cameras, radio frequency identification, a near field communication device, Global Positioning Systems, or other technologies. The network layer, also referred to as the transportation layer, is responsible for data communication between devices. This includes wired technologies, such as USB, Ethernet, Optic fiber, or Asymmetric Digital Subscriber Line; and wireless technologies, such as Wi-Fi, Bluetooth, Zigbee, or Long-Term Evolution. The application layer serves as the top-level layer connected with end users and applications, such as energy management and the environmental control.

IoT architectures have been utilized for various applications in buildings. The system and architecture described herein may be used for implementing these applications. For example, a Bluetooth low-energy based system through wearable devices may be used for localization of occupants in an IoT-enabled museum. The wearable devices may track the location of the visitors and provided relevant information according to the location. An IoT-based system for energy management of residential buildings based on the techniques described herein may provide energy monitoring, automation and demand response, and home security. A platform with environmental sensors may be provided to support smart building facility maintenance. The platform may detect abnormal operation and faulty equipment before notifying the building operator. In addition to better energy and facility management, occupants' thermal comfort may also be enhanced by IoT. Some embodiments may provide an integrated framework of IoT big data analytics to monitor and control the building systems. This may support decision-making when the data value is outside of the comfort range. In some embodiments, systems according to the techniques described herein may also provide controls for occupant safety and health as well as building structure safety.

Example Design of the IoT Architecture

To accommodate data-driven experimentation, an example building infrastructure is described herein, which may be referred to herein as "HouseZero." HouseZero may be a wood frame residential structure, which was transformed into a research/office building, with meeting rooms, offices, workspaces, and novel heating/cooling technologies. Other building structures and designs may also be used. The exemplar building may have a three-floor structure and a basement.

Example Network Topology

Example Thermal elements

FIG. 1 is a schematic diagram of an example building 100, according to some embodiments. FIG. 1 shows principal thermal elements (heating or cooling components) of the building. The example shows super-insulated walls and roof 102, solar photovoltaics and hot water 104, a thermal vent 108, motorized windows 110, manually operated windows 112, a heat pump 114, a network closet 116, and different sections, floors, or zones of the building 118, 120, and 122. The network closet 116 is the bottommost floor. A geothermal well 124 may be connected to the building. The building may also be connected to a local weather station 106.

As shown in FIG. 1, the building 100 (sometimes referred to as HouseZero) is an experimental ultra-energy-efficient prototype retrofit of a wood frame building, with no conventional heating, ventilation, and air conditioning (HVAC) system. Instead, indoor thermal comfort may depend, in some embodiments, on natural ventilation, solar insolation, thermally active building systems, and/or geothermal wells, and may be driven by computational control of pumps, valves, motors, and/or a heat pump. Computational control may in some embodiments be based on readings from an embedded network of interior and exterior sensors. Some embodiments may include integrated building systems and actuator.

In addition to the normal operation, computational research at the building may be focused on innovation in building design, construction, materials, and technologies, as well as innovative approaches to real-time data-driven control of the heating/cooling systems coupled with natural ventilation. This may include simulations and/or computations such as Computational Fluid Dynamics ("CFD") and Machine Learning ("ML") algorithms that may produce or otherwise use extremely large data files, which can benefit from high-bandwidth fast network connections. The system may also include real-time computer simulation and control, including "Mixed Reality (Augmented Reality ('AR'))" which may also benefit from extremely low-latency communications. Accordingly, a specialized computing, communications, IoT and multi-media-capable network may be used.

Example Communication network

Figure 2:
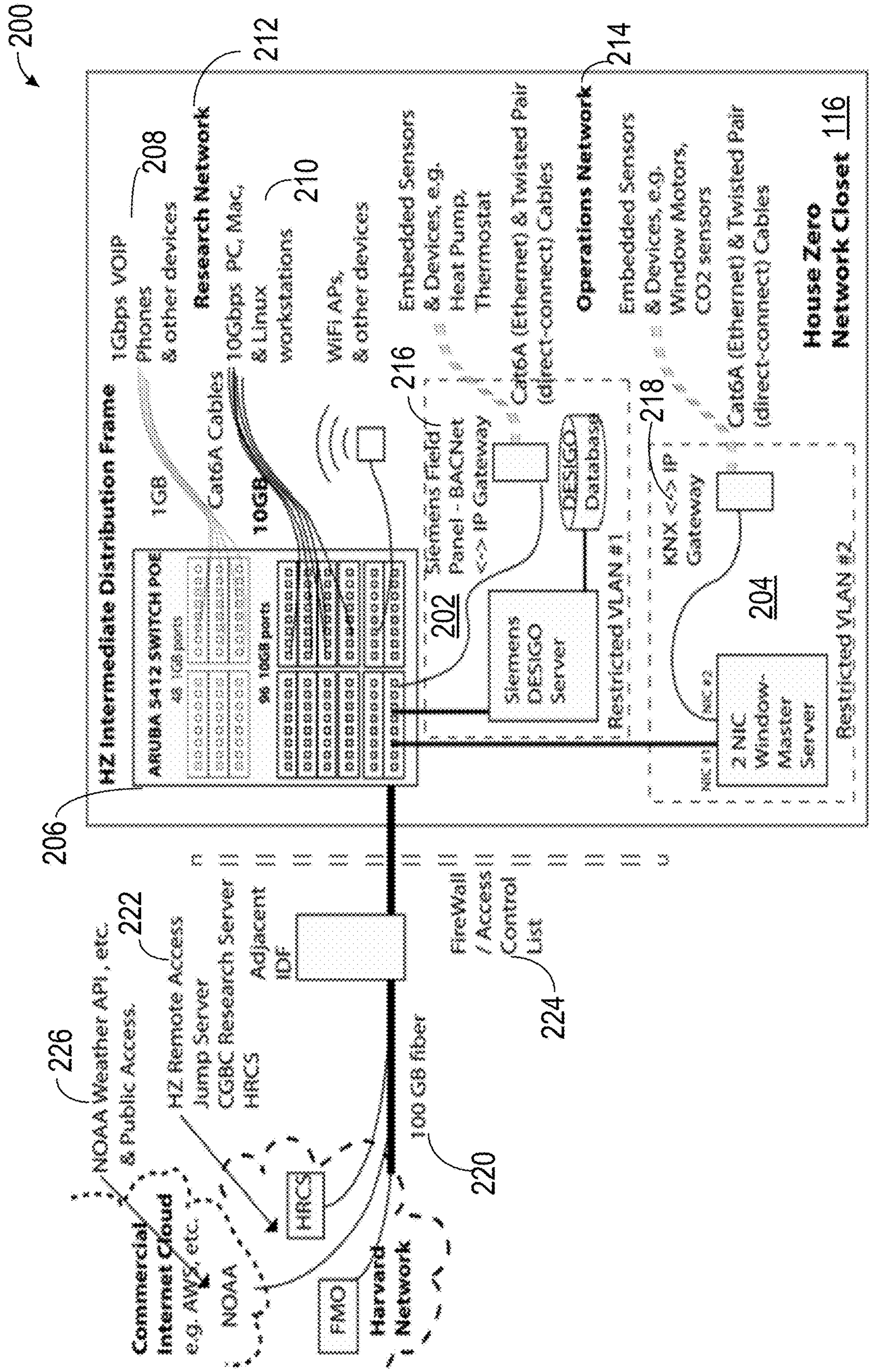
FIG. 2 is a schematic diagram of an example communication network in accordance with one aspect of the present disclosure.

FIG. 2 is a schematic diagram of an example communication network 200, according to some embodiments. The communication network 200 may be at least partially housed in the network closet 116. The communication network may include an operations network 214 (e.g., for connecting embedded sensors and devices, such as window motors, CO2 sensors) and a research network 212 (e.g., for connecting embedded sensors and devices, such as heat pump and thermostat). A more complex network than that typically presently used in residential or commercial buildings may be used to support an IoT including elements of the structure, from thermostats to occupancy sensors and outdoor wind-pressure sensors, as well as connections to remote web resources, coupled with reasonable security and reliability concern. The network and IoT infrastructure may be configured to support HouseZero's academic and research activities and needs, including ordinary computing/communications needs of staff, as well as computationally intensive research computing activities (e.g. real-time simulations and model-based data-driven control of building heating and cooling systems) by researchers, a dense network of attached and embedded sensors throughout the structure, inside and out, and heating/cooling equipment operations such as motorized windows (e.g., the motorized windows 110) and a low-temperature high-efficiency heat pump.

As disclosed herein, electronic components may be selected based on energy efficiency and also may be selected based on ability to accommodate high throughput and connectivity over several network protocols (which may include TCP/IP for ordinary data/telecommunications and multimedia, Building Automation and Control Network ("BACNet") and KNX for building automation ("BA") components).

As shown in FIG. 2, HouseZero may be connected for general-purpose telecommunications, both wired and wirelessly, via the Internet protocol suite (TCP/IP), e.g. over ethernet or other networking technology, e.g. standard networking technology. For greater security over network traffic within and from outside the structure, the building network may be further segmented into distinct private local-area networks, or 'Virtual LANs' ("VLANs)" (e.g., VLAN 202 for the research network 212 and VLAN 204 for the operations network 214). VLANs may define a specified range of device Internet Protocol (IP) addresses that are connected inside a closed network that may be otherwise inaccessible to other devices/IP addresses, without specific permissions being granted. VLANs may include both routable/global IP addresses (e.g. of the form 128.x.x.x, that can be accessed by other IP devices anywhere on the global Internet) and un-routable/local addresses (e.g. of the form 10.x.x.x, that can only be accessed by other devices physically or logically connected to the segmented subnet) for security, privacy, and higher speeds due to reduced traffic on the restricted subnets. Devices on segmented VLANs with un-routable 10.x.x.x addresses may thus be protected from exposure to the open Internet, which may provide enhanced security for sensitive information or critical operational devices.

The building may use a fiber-optic feed 220, which may enter a network closet, which may be in an adjacent building, and intermediate distribution frame ("IDF") physically secure rack of equipment. An underground 4" conduit may carry 6-strand MultiMode fiber optimized to work with fiber optic into a second network closet, which may be within the building, and IDF. Internal cabling in the building may be Category 6 Augmented (CAT6A) cable, which has nearly twice the bandwidth and distance limitation of standard CAT6 cabling. This may be used to support high-bandwidth data, which may be used for high-frequency real-time data sensors, large files used by or generated by computer simulations, such as Clustered File Systems ("CFS"), and multimedia/video/image files.

A network closet within the building (e.g., the network closet 116) may house an IDF or network/telecommunications rack 206 for network components. The rack may be a managed central switch: e.g., a 10 GB 144-port high-capacity Aruba switch (Model 5412), with redundant power supplies and both 10 GB/sec (10 Gbps) and 1 GB/sec (1 Gbps) Power-Over-Ethernet (POE) ports (cable connections).

In some embodiments, desks, offices, and workspaces within the building may be equipped with "Voice-Over-IP" (VOIP) POE telephones and some other devices that can only handle 1 Gbps maximum bandwidth, so the Aruba Model 5412 managed central switch supports 48 ports 208 for those devices at 1 Gbps and an additional 96 ports 210 at 10 Gbps; between computer workstations, various IoT devices, and office telephones, about half of these ports are utilized, and about half remain available for future expansion.

The building may in some embodiments contain RJ-45 (standard) Ethernet jacks (outlet plugs) for general computing & communications. Ethernet jacks may be POE 1 Gbps or 10 Gbps jacks capable of supporting VOIP telephony. Cisco POE-powered VOIP phone-sets may be used, which may be limited to 1 Gbps connections; 10 Gbps connections may be reserved for administrative and research computer workstations and multimedia content. A 10 Gbps network may support distributed high-powered computation & visualization software, such as airflow analysis and simulations and MatLab for optimization, high-resolution digital imagery and/or video data.

The building network closet may also house other electrical control panels, where individual cables and twisted-pair wires from devices and sensors may terminate and may be converted into IP over the network. Power backup may also be provided by a battery system in the building, able to operate most of the essential loads and is designed for experimentation.

Secure wired and wireless access may be controlled by a centralized computer registry which may use strict and fine-grained access, authorization, and security and encryption controls, including two-factor authentication, to prevent unauthorized or malicious access or interception of data.

Example Sensor network

The building may be monitored with an extensive sensor network of physical sensors and meters. Outdoor sensors may be included, such as sensors for ambient temperature, relative humidity, wind speed and direction, and solar radiation; indoor sensors, such as air temperature, relative humidity, carbon dioxide (CO2) concentration, occupancy, slab temperature, and wall surface temperature; and sensors and meters for the systems, such as BTU meters and an electrical meter. A sensor network akin to that found in may be included in B. Yan, X. Han, A. Malkawi, T. H. Dokka, P. Howard, J. Knowles, T. Hegli, K. Edwards, Comprehensive assessment of operational performance of coupled natural ventilation and thermally active building system via an extensive sensor network, Energy Build., 260 (2022), pp. 111921, may be used.

The building may contain several linear kilometers of Cat6A and other RS485 (serial protocol) twisted pair wiring, primarily connecting the sensors and actuators for building components' monitoring and control. Sensors may be hard-wired to BACNet and KNX network lines, connected through junctions, field panels, and adapters to controllers. For energy efficiency, air-infiltration may be minimized, and thermal bridges through wall penetrations from exterior may also be minimized. Cables and conduits may be embedded in wood-frame wall cavities using conventional energy-conscious installation standards.

There may be two category uses for sensors: operation and research. Operational sensors may include basic indoor slab and air temperatures, local zone thermostats, CO2 sensors to evaluate occupancy, and local weather station for temperature, rain, etc. These sensors may be sufficient for use with a rule-based algorithm, which may be used for heating and cooling operation, e.g., of a geothermal heat-pump, motorized windows, and solar thermal vent. Research sensors may include finer-grained and more extensive sensors, which may include low-height (below the knee) and/or high-height (above the head) temperature sensors, to detect stratification in various spaces, and low-velocity air-motion sensors, to detect air movement and buoyancy-effect drafts throughout the structure as well as calibrate simulation measurements. BTU-sensors may also be attached to heating zones, tubing, manifolds, and valves to better understand distribution of heat along with fluid flows and temperatures. Each electrical circuit and each solar panel may also be independently metered, to measure production over time. A redundant whole-house meter may also be used, to provide a check on the aggregate of individual readings. Research sensors may be used to gather data for analysis and support building research based operations using the data-driven approach.

Example Building Operations and Research Networks

Figure 3:
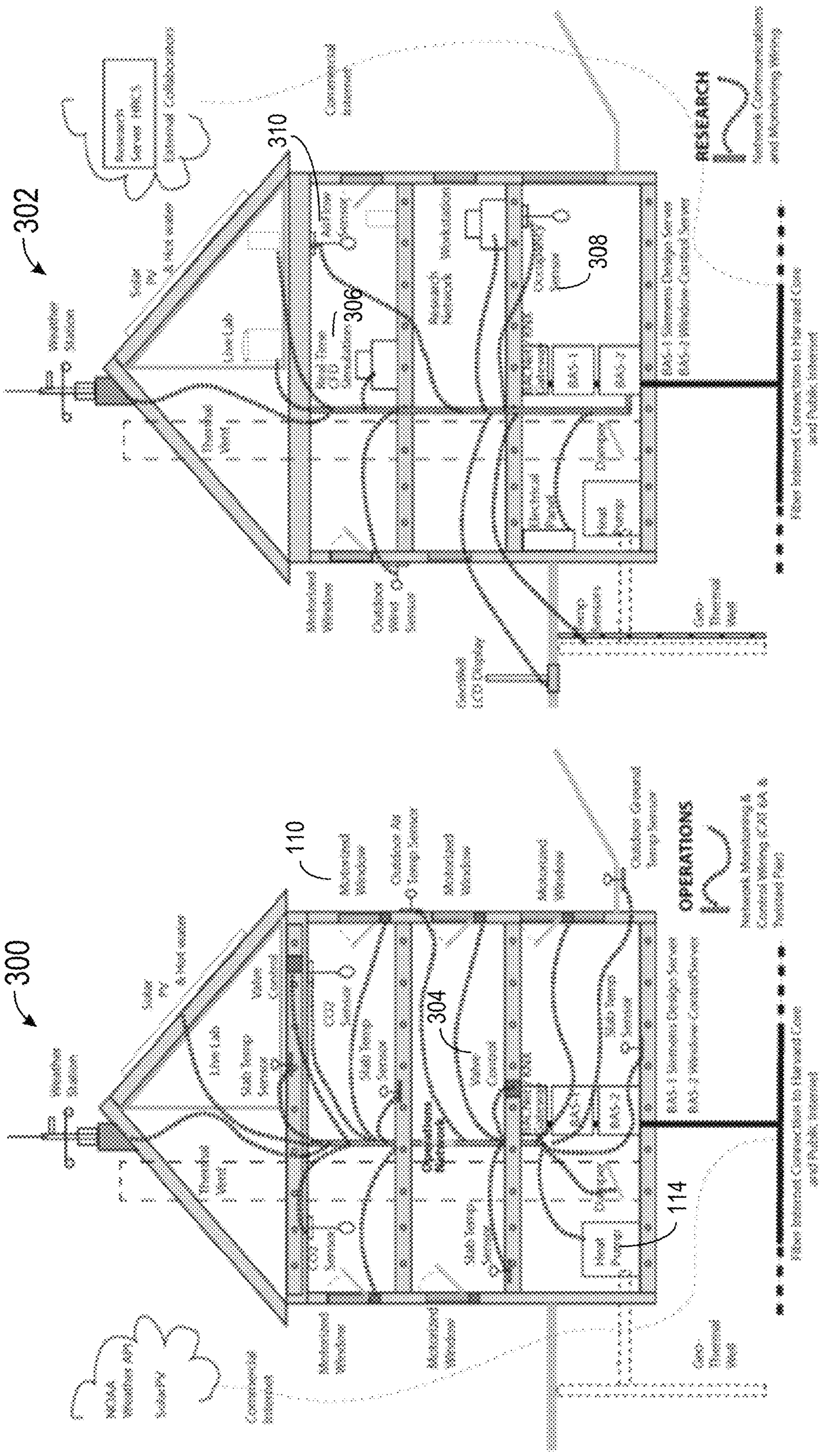
FIG. 3 is a schematic diagram of an example operations network and an example research network, in accordance with one aspect of the present disclosure.

FIG. 3 is a schematic diagram of an example operations network 300 and an example research network 302, according to some embodiments. As shown in FIG. 3, building network infrastructure may be divided into two separate but overlapping subsystems, which include networks: an Operations Network 300 (e.g., the operations network 214, FIG. 2) which may directly manage IoT equipment such as valves 304, motorized windows 110, and heat-pump 114; and a Research network 302 (e.g., the research network 212, FIG. 2) which may support communications, sensors and equipment not directly connected to building operations, and high-performance computing, such as CFD simulation and analysis 306. Some embedded sensors (e.g., thermostats) may be tied (e.g., directly connected) to equipment operations; others may be more general purpose sensors (e.g., occupancy sensors 308) or special-interest sensors (e.g., airflow sensors 310) supporting research activities.

In some embodiments, the operations subsystem, which may also be referred to herein as Building Automation Server 1 ("BAS-1") or the operations server, may operate using existing commercial rule-based software. A separate system, e.g. a data analysis subsystem, may be integrated with the commercial software to be able to acquire data, store it, and control and command the building as needed, which may be based on evolving research and experiment. Commercial software may be replaced over time with data driven algorithms, e.g. from data gathered and analyzed by the data analysis subsystem (sometimes referred to as a data-driven server or subsystem). The operations subsystem may use a KNX network. The data analysis subsystem, which may also be referred to herein as Building Automation Server 2 ("BAS-2"), may use a BACnet network. Each subsystem may interface with the other to operate the building. In some embodiments, a third separate and independent system may be used to fetch the data (e.g., real-time data and historical data) from the BAS-2 subsystem and allow functional protocols to be used to command the building through the data analysis server and may eventually bypass the commercial software to command actuators through the interfacing developed.

Example Operations Network or Subsystem

Heating and cooling components (e.g. sensors, valves, window motors, et al.) may be interconnected on a restricted-access 'Operations' network (e.g., the operations network 214), which may use Ethernet/IP (e.g. for TCP/IP communications, and connection to the Internet, as streams of packets of information) and/or twisted-pair local wiring as appropriate (e.g. for individual sensors, motors, valves, et al. which may operate on a purely electrical voltage rather than a stream of packets). This operations network may be partitioned into two distinct restricted access secure VLANs (with capacity of 30 hosts per each subnet):

- Outdoor and indoor temperatures, as well as Electrical, Lighting, and other systems may be monitored and controlled by BAS-2, using IP and BACNet, e.g. in the secure 'BAS-2 VLAN #1';
- Window Motors, heating/cooling zone valves, and CO2 and other sensors and systems may be monitored and controlled by BAS-1, e.g. in the secure 'BAS-1 VLAN #2'.

"Secure" in this sense means that these networks are logically, and even physically, disconnected from any other network, and controlled by a "Firewall" or one or more "Access Control Lists" (ACLs) (e.g., Firewall/Access Control List 224) that limit which devices or machines can connect to the network. This limits the potential for outside malicious (hacker) interference in operations.

BAS-1 motorized window controllers and sensors may use standard KNX protocols. Control logics may be implemented in the operations server and then provided to the BAS-2 system for commanding only the heating and cooling of the building. BAS-2 devices may primarily use BACNet controls. KNX-BACNet gateway 216 and KNX-IP gateway 218 may be used for interconnection, converting from BACNet and KNX device-specific protocols to IP for general network transmission.

BACNet and KNX are both "serial" protocols, which means that devices can be "daisy-chained" together, on a single continuous loop of wire. Individual devices each have a unique ID that they inject into the signal stream along with other data, so a controller can uniquely identify each sensor reading or direct each control command to a specific device.

These two protocols were implemented so that the building can experiment with eliminating the commercial rule-based software using a data-driven algorithm that will use the BACNet BAS-2 as a medium to run zones in the building. The components within VLAN1 are accessible via protocols to allow direct data retrieval, as well as the monitoring and commanding of sensors, motors, and other IoT devices for research proposes.

Example Research Network (Data Analysis Subsystem)

A research server (sometimes referred to as the data-driven server) may interact with BAS-2 and may enable researchers to have direct control of sensors, motors, and other IoT devices, which may occur via a webservice Application Programmer's Interface (API).

Workspaces may be interconnected with Ethernet, e.g. 10 GB Cat6A wired Ethernet and/or WiFi, e.g. 5 GHz WiFi, supporting telecommunications, multimedia, and high-end visualization and simulation software. The research network may be designed to support research and be connected to the research server. The research server may support the deployment of a special purpose API, written in Python, to permit controlled access from the outside world (e.g., remote research collaborators) to selectively read specified elements of the building research and operations data. The research server connects to the research network, which uses BACNet controls that are, in some embodiments, not primarily related to the operation of the building. The controls support the development of in-house algorithmic control systems, which may ultimately be used to bypass the existing commercial server's software currently used for operations. This may be done by allowing direct connections to IoT components that includes direct monitoring and control of devices, such as temperature sensors and electronic valve controls. Machine Learning (ML) techniques may also be used to analyze and learn from real-time and archival data, in order to develop real-time operational control of all zones.

Sensor data may be collected at various frequencies and intervals, including some data collected once per second, other data points collected every 60 seconds, and some data collected every 15 minutes of every day or per change of state. The capability for extremely high temporal resolution (one measurement per second, e.g.) may be built into the operational apparatus for the building. Operational data that may be used to control the building's thermal regime, may be used and/or collected across a range of frequencies, from per-second to hourly.

Control of the Automated Building Management System may be divided between BAS-2 and BAS-1. The BAS-1 system may be a rule-based system responsible for, among other things, actuation of motorized windows (e.g., the motorized windows 110) based on CO2, occupancy sensors, and calling for heat or cooling, e.g. from a geothermal heat pump, based on zone thermostats. The BAS-2 system monitors sensors, controls some systems, stores sensor data for analysis, and commands the heating and cooling, and may interact with other building automation systems.

A workstation may be used for monitoring and visualization of the building performance with a commercial data visualization and control software. BAS-2 may be a moderately-powered server. BAS-1 may be a general purpose computer. It may have 2 separate network interface cards, e.g., one for connection to the Operations network; and one for BAS-1 proprietary connectivity. The first Network configured on BAS-1 Private Network (10.xxx) may be used for connection to sensors, motors, and valves. The second network may be configured on BAS-2 Operations VLAN, for data transmission to and/or from the BAS-2 system.

BAS-2 and BAS-1 VLANs may, for security reasons, be tightly restricted, e.g. with no outside access except for strictly limited firewall-controlled access (e.g., access 226, FIG. 2) to National Oceanic and Atmospheric Administration (NOAA) Weather Web Service and Solar PV monitoring applications in the cloud.

In some embodiments, a separate research server (sometimes referred to as a data-driven server, 414, FIG. 3, described below) may be provided. The research server may in some embodiments be a Virtual PC in a cloud, e.g., Amazon Cloud. The research server (sometimes referred to as research compute server ("RCS") may be used for additional testing and development. RCS may interface with building systems to retrieve selected data points in real-time or historical trends via API from BAS-2 database. In addition, RCS may be enabled to securely fetch from outside sources, such as NOAA, etc. and to send commands via API to remotely controlled devices and components, converting to BACNet or KNX as required. These commands can command and operate operational suites on all elements of all zones.

Remote access (e.g., remote access 222, FIG. 2) to the above disclosed servers may be controlled and secured through a "Jump_Server topology" and may be a two-step process. Remote users may first be required to connect through a virtual private network (VPN) network with Remote Desktop technology to a hardened and isolated "Jump Server," which may have a limited number of users who may be required to use two-factor authentication. In some embodiments, the Jump Server may be a cloud server, e.g. in an Amazon AWS cloud. From the Jump Server, remote users may then initiate a connection over Remote Desktop protocol to the BAS-2, BAS-1, or RCS research server. Strict IT security rules, including strong passwords, two-factor authentication, carefully regulated roles and permissions with separate "Admin" level accounts, and other rules, may also be implemented for security.

Example Operations and Research Dataflow

Figure 4:
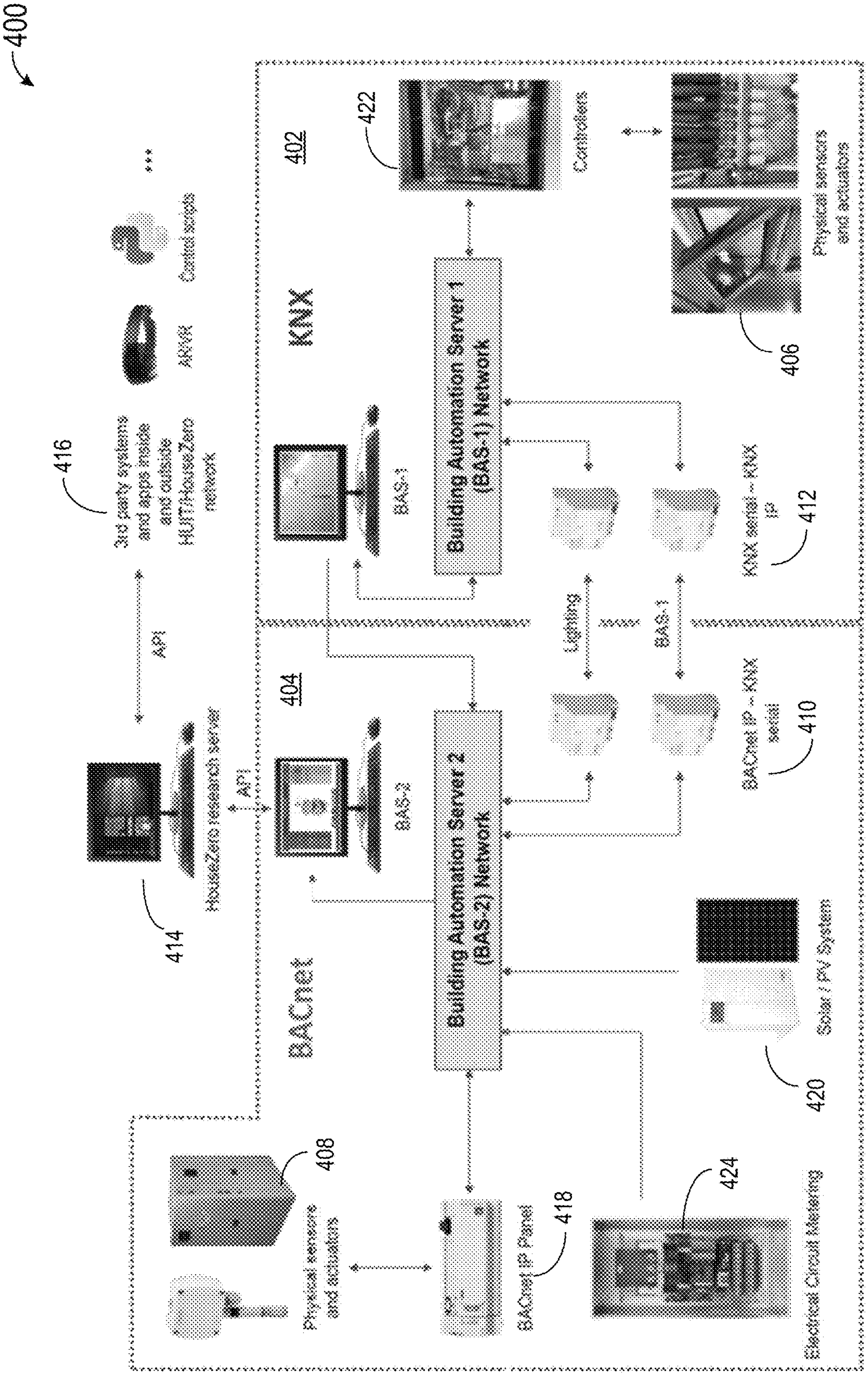
FIG. 4 is a schematic diagram of an example system for operations and research, in accordance with one aspect of the present disclosure.

FIG. 4 is a schematic diagram of an example system 400 for operations and research, according to some embodiments. As shown in FIG. 4, a building may have two distinct control systems, such as BAS-1 402, which may use the KNX protocol, and BAS-2 404, which may use the BACnet protocol. In some embodiments, each system may have physical input and output devices (e.g., the system 402 includes physical sensors and actuators 406 and the system 404 includes physical sensors and actuators 408), including a temperature sensor, CO2 sensor, electric circuit meters, PV system 420, valves, and window actuators. Data from sensors may first be stored at the panel level (e.g., BACnet IP Panel 418), then at a defined frequency, this data may then be collected to the software applications, on the two BAS servers. Commands may be sent to actuators from each software application. Two systems are connected by two pairs of gateways converting BACnet IP to KNX serial (gateway 410) and KNX serial to KNX IP (gateway 412). In some embodiments, one pair may be assigned for lighting communication, and another may be assigned for the rest of the communication. The system may also be expandable to third party systems and applications 416, e.g. via a research server 414 (sometimes referred to as a RCS research server).

The system 400 may be used to research, test and demonstrate benefits of novel heating, cooling, and construction technologies and materials. Controllers 422 may take real-time readings of critical values and/or may adjust two components—geothermal water flow and window opening/closing—to keep the interior in the comfort zone under the conditions with various uncertainties. The system 400 disclosed herein may also enable or facilitate data analysis and data-driven software development.

In some embodiments, the system 400 may be developed using Python. The system 400 may interface with building systems to read ("get data") from a range of sensors and write ("send commands") to actuators that control the flow of water and air used for heating and cooling. In some embodiments, web services may be used to connect to the BAS-2, which may relay information from sensors, and may send commands to actuators via BACnet, through the BAS-1 and KNX, to the window sensors and motors.

The system 400 may use a database of 'points' (data sources, sensors, and actuators) that can be read and/or written to. Each point holds three name-value pairs for addressing: {"name": Display name of the point, "path": Path to the data point in BAS-2 "point". Point name in BAS-2}. For example: {"name": "Rm0 South Wall Temp", "path": "BACnetNetwork1.Hardware.HS_ZERO_NODE_01.Local_IO", "point": "HVD_ZERO_RM0_2_SOUTH_WALL_TMP" }.

Two example function calls are getValue(path, point) and setValue(path, point, value), which read and return a sensor (point) value, or write data to an actuator (point), and return any error codes. For example:

getValue('BACnetNetwork1.Hardware.BAS-1_Gateway.Local_IO', 'Z31_RH') would return the relative humidity for Zone 31.

setValue('BACnetNetwork1.Hardware.WM_BACnet_Gateway.Local_IO,''Z31_SKYLIGHT', '50') would open the Zone 31 skylight to 50%.

This infrastructure can be a powerful tool for experimentation, researchers, both internally and remote researchers using secure VPN connections to interrogate (quarry and trending real-time data or historical data) and command the building from afar.

Individual actuators, such as valves controlling the flow of water from the heat pump, can be combined into 'zones,' as in traditional building heating systems, which can have different profiles and behavior due to the distributed sensor system.

Algorithms and logic within the RCS may be used in conjunction with the framework of the HouseZero technical infrastructure. Techniques including functional programing, Machine Learning, and close to real-time simulation may be combined to provide nuanced control and effective energy-efficiency management. Model predictive control may enable the system to optimize immediate/current time horizons, and to anticipate future events (e.g. using weather forecasts).

This dense network of readable/controllable 'points' may also be coupled with a detailed 3D geometric model of the building, which may in some embodiments be combined to form an effective 'Digital Twin' of the building, which can be isolated in simulations and experimented on. The building may also employ a modular and exposed structure and wiring, which may make it possible to incrementally experiment with heating/cooling components and control logics. In some embodiments, further experimentation may take place in a 'Live Lab' may be located in an isolated part of the building, such as a separate floor. In the figures, the Live Lab is depicted on the third floor. The Live Lab may provide a testbed for hybrid (mixed digital/analog) experimental components and control systems.

The building monitoring system 400 may be primarily based on the BAS-2 system. Pre-set alarms on temperature conditions and equipment status may be monitored, and automatic notifications, e.g. emails, may be sent, e.g. to appropriate individuals, in the event of a building emergency or heating/cooling/electrical failure. The building may also be direct wired for fire alarm and suppression systems (sprinklers) as a life/safety precaution, an alarm system, and an emergency lighting system with a dedicated battery backup system.

The Sensor Network may, in some embodiments, acquire hundreds of readings per hour, which may be stored at BAS-2, e.g. to a local hard disk. Cloud storage and/or backups may also be used. Researchers may then be able to access historic data at various levels of aggregation, and these can be used in trending analyses and for verification and calibration of simulations. A repository may be maintained, e.g., for data to be shared with the research community.

Example Hybrid Physical and Virtual Testbed

Large quantities of data generated by the sensor network as disclosed here may enable researchers to develop advanced learning-based control algorithms to improve building operations in new ways. A hybrid physical and virtual testbed may be used. The hybrid testbed may be based on the IoT infrastructure to provide additional capabilities of testing the learning-based control algorithms comprehensively and reliably.

Figure 5:
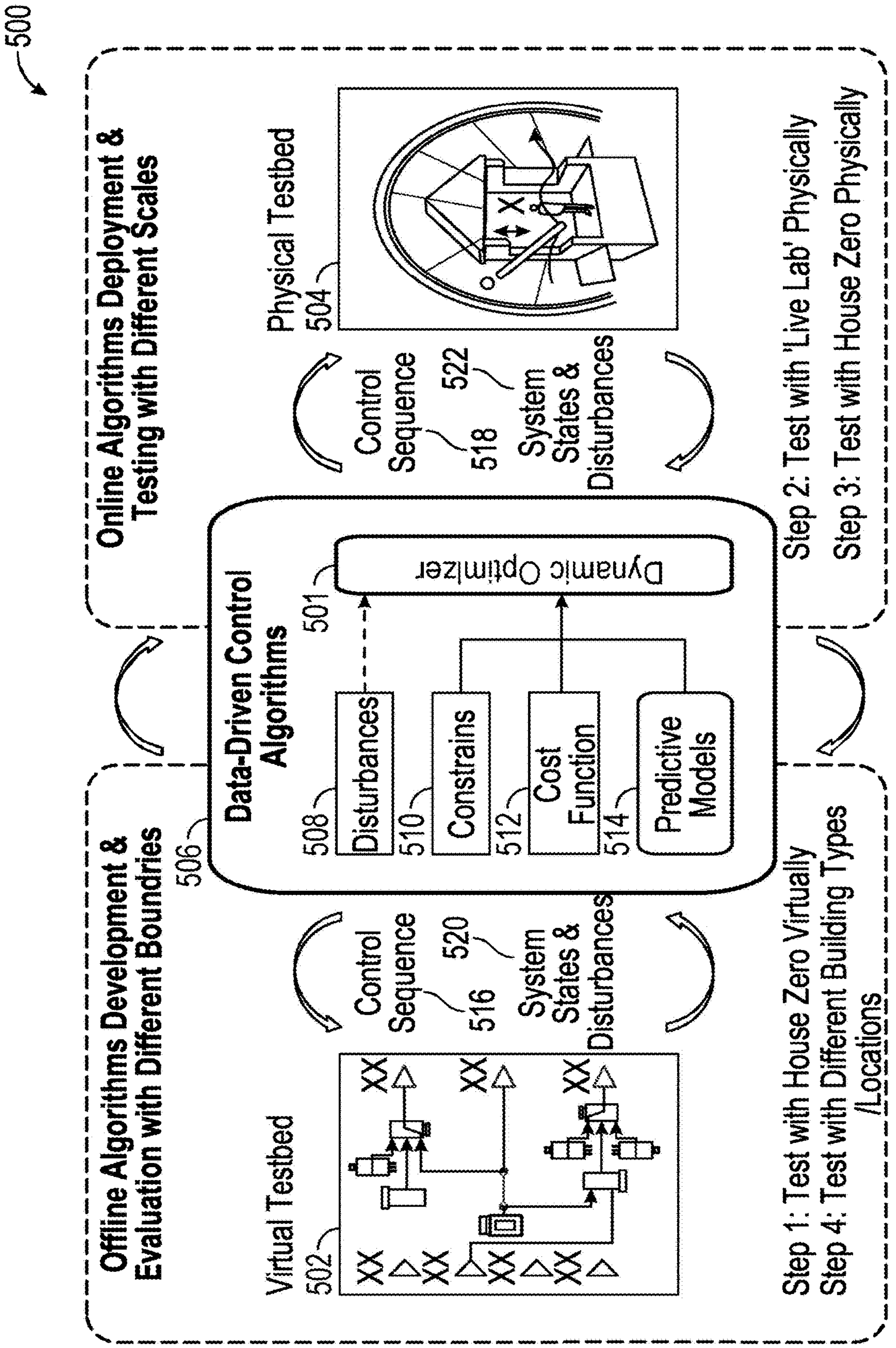
FIG. 5 is a schematic diagram of an example process for developing a learning-based control algorithm based on a virtual testbed and a physical testbed, in accordance with one aspect of the present disclosure.

FIG. 5 is a schematic diagram of an example process 500 for developing a learning-based control algorithm (sometimes referred to as data-driven control algorithm) based on a virtual testbed 502 and a physical testbed 504, according to some embodiments. As shown in FIG. 5, the proposed learning-based control algorithms 506 can be firstly evaluated (step 1) on the virtual testbed using different scenarios with controlled boundary conditions. The selected algorithms can then be tested (step 2) on the physical testbed ('Live Lab') (e.g., on a third floor of the building). Once deemed successful within the smaller scale of the 'Live Lab,' the algorithms can be deployed (step 3) on multiple zones or the entire building to evaluate their effectiveness in real operation. After demonstrating the success of the technologies in the building, the technologies may then be assessed (step 4) with the virtual testbed for their potential performance and impacts, if being applied to different building types and at different locations in scale. A dynamic optimizer 501 of the data-driven control algorithms may use disturbances 508, constraints 510, predictive models 514 and/or a cost function 512 to generate control sequences (e.g., sequences 518 and 516) for the physical testbed 504 and/or the virtual testbed 502. The virtual testbed 502 and the physical testbed 504 may provide system states and disturbances 520 and 522, respectively, to the data-driven control algorithms 506.

Example Physical 'Live Lab' Infrastructure

Figure 6:
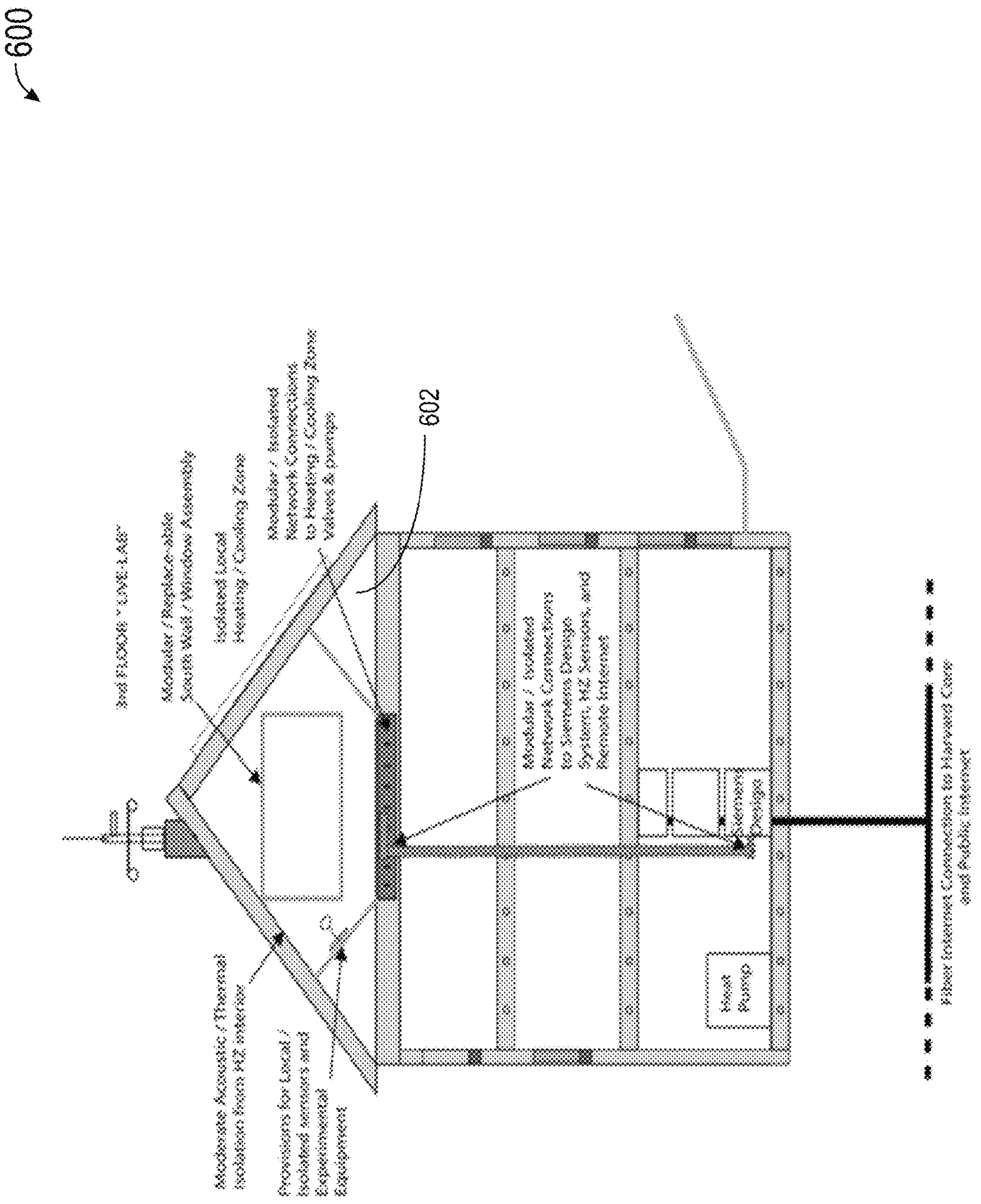
FIG. 6 is a schematic diagram of an example 'Live Lab' in accordance with one aspect of the present disclosure.

FIG. 6 is a schematic diagram of an example 'Live Lab' 600, according to some embodiments. The building may contain an experimental apparatus known as the 'Live Lab,' as shown via the example in FIG. 6. In FIG. 6, the south end of the top floor of the structure 602 is designed to be somewhat thermally isolated from the rest of the structure, which allows for isolated control over its heating and cooling zones by controlling plumbing valves that feed the tubing inside the thermal slab from the geothermal heat pump or from solar thermal. It also allows for the replacement of and experimentation with elements of the south facade and exterior wall and windows. This feature can be used to run extended experiments with new materials, components, devices, algorithms, and control systems, as well as to test these items in a relatively isolated manner from the rest of the structure. For example, the room heating and cooling thermal zone can be programmed to use real-time data to switch between and combine fluid from the geothermal system and from the solar hot water panels on an experimental basis. They can also be turned off to run experiments using other means for cooling and heating.

Network connections to the Live Lab 600 may be ordinary 1 GB and 10 GB data jacks on a separate controlled VLAN. Data from the Live Lab may be stored in a database at BAS-2, or directly on attached devices and storage as appropriate. The isolated physical testbed may be designated to remain unoccupied, leaving the room free for experimentation.

Example Digital Twin Virtual Testbed

Figure 7:
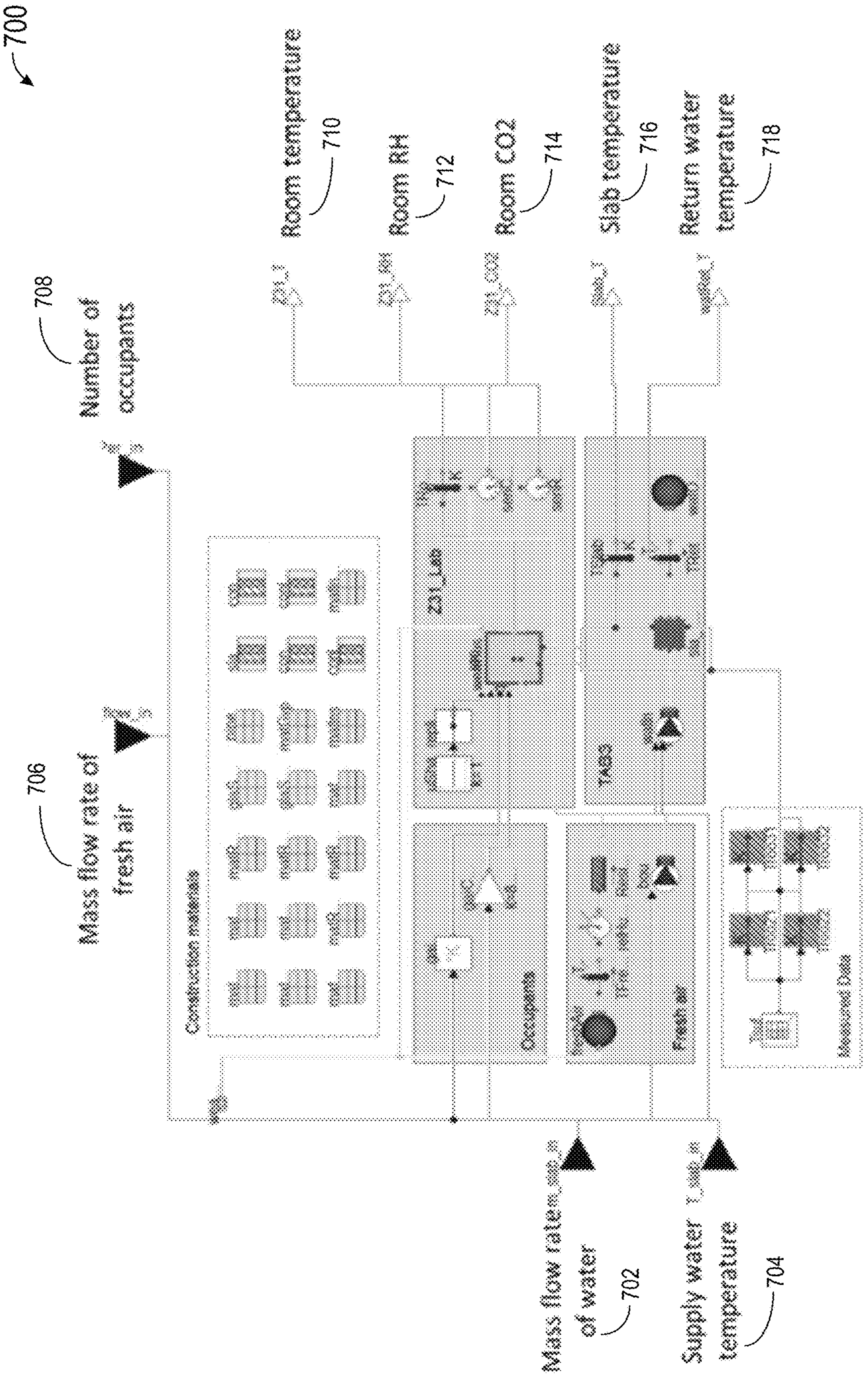
FIG. 7 is an example implementation of a digital twin model of the Live Lab of FIG. 6, in accordance with one aspect of the present disclosure.

FIG. 7 is an example implementation of a digital twin model 700 of the Live Lab of FIG. 6, according to some embodiments. The digital twin model 700 of the third floor ‘Live Lab’ may be used as a virtual testbed in conjunction with the physical testbed. The model may implemented in Modelica. The model may be linked with control algorithms, which may be implemented in Python, e.g. through a customized interface based on the “Python36” module developed in the Modelica Buildings library. The modeled room as shown in FIG. 7 has a floor area of 8.18 m2 with a height of 3.84 m. The exterior constructions include a south wall and window, a roof, and a skylight. A concrete layer may be added to the slab, forming a high level of thermal mass. Radiant tubes may be embedded in the slab, with hot water supplied by a ground source heat pump.

Inputs of the room model may include supply water temperature 704, flow rate of water 702, flow rate of fresh air 706, of the radiant heating system, and/or number of occupants 708. Outputs may include the room temperature 710, slab temperature 716, return water temperature 718, room RH 712, room CO2 714, and so on. The heat and mass balance of the room may be modelled based on the MixedAir module in Modelica Buildings library. Partition walls may be modelled with adiabatic boundary conditions since the adjacent rooms are conditioned with the same setpoints as the studied room. The floor may be modeled as a construction with water piping embedded.

Figure 8:
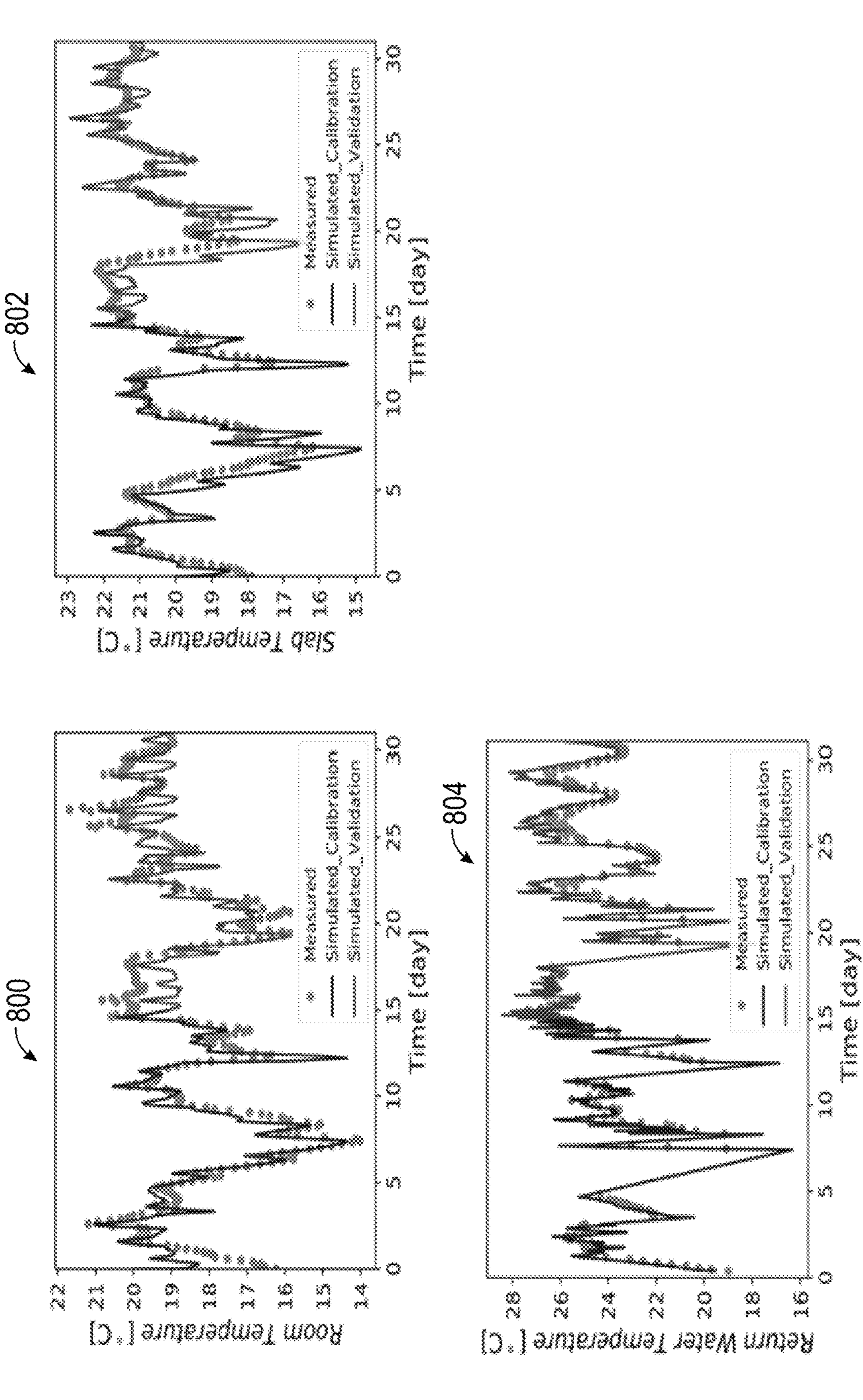
FIG. 8 shows graph plots for a comparison of the measured values and predicted values from the digital twin model, in accordance with one aspect of the present disclosure.

The room model may be calibrated and validated with high-fidelity measured data collected and stored through the developed IoT architecture from the building. FIG. 8 shows graph plots for a comparison of the measured values and predicted values from the digital twin model 700, according to some embodiments. The measured data in December 2020 is divided into two parts, in which the data from December 1st to 15th is used for calibration and the data from December 16th to 31st is used for validation. Graph plot 800 corresponds to room temperature versus time of day, graph plot 802 corresponds to slab temperature versus time of day, and graph plot 804 corresponds to return water temperature versus time of day. Measured values are shown as dots, simulated calibration values are shown in blue and simulated validation values are shown in red. The predictions and measurements are in agreement for all the parameters for both calibration and validation. The Mean Absolute Errors (MAE) are less than 1 K for all the parameters for both calibration and validation.

Example Applications

Example Data-driven Control Experimentation

In this section, the use of deep learning-based model predictive control for automatic window operations using the IoT architecture presented above is disclosed, according to some embodiments. A developed adaptive model predictive control (AMPC) algorithm may utilize a machine learning model (e.g., Long-Short-Term Memory (LSTM) deep learning model) for identifying the thermal dynamics and CO2 trends. Multi-objective optimization may be used to optimize the indoor air quality, thermal comfort, and energy efficiency. A rule-based control (RBC) may also be included as a baseline. For example, if indoor air temperature (Troom) is higher than 22° C. and indoor CO2 concentration is larger than 800 ppm, the window may be configured to open at an angle of a specified degree, which may depend on the outdoor air temperature (Tout); otherwise, the window will be configured to remain closed.

A control algorithm may be tested on the virtual testbed and then deployed through the research server and network on the third floor ‘Live Lab’ of HouseZero. The control performance of each controller was compared and is presented in Table 1. It is found that the model predictive control (MPC) and AMPC are more effective in maintaining indoor CO2 concentrations below 800 ppm, achieving 96.6% and 92.5% of the simulation period, respectively. In contrast, RBC is less effective, achieving only 69.1% and adopting the MPC and AMPC results in 3% and 6.6% of the simulated time under high CO2 conditions, respectively. In contrast, using the RBC leads to 24.6% of the simulated time under high CO2. By analyzing the unmet conditions when the CO2 is higher than 1000 ppm, MPC controllers results in less than 1% of simulated time with unmet conditions. In contrast, the RBC gives rise to 6.3% of simulation period with unmet CO2 conditions, which is approximately 7 times higher than the AMPC, as well as about 15 times more compared with the basic MPC.

TABLE 1

Two months simulation control performance results with different controllers

| | IAQ-CO2 (ppm) | | | Temperature (°C) | | Total Heating Loads |
|---|---|---|---|---|---|---|
| | ≤800 | 800-1000 | >1000 | ≤20 | ≤19 | (kWh) |
| RBC | 69.1% | 24.6% | 6.3% | 1.0 | 0.2 | 453 |
| MPC | 96.6% | 3.0% | 0.4% | 154.7 | 69.6 | 460 |
| AMPC | 92.5% | 6.6% | 0.9% | 82.4 | 5.1 | 457 |

The controllers were also evaluated in terms of indoor air temperature control, in addition to indoor CO2 levels. The results indicate that AMPC provides significant advantages in terms of maintaining a comfortable and stable indoor thermal environment. During the 2-month simulation period, the AMPC system resulted in only 5.1 occupied hours below 19° C., which is 93% lower compared to basic MPC. This improvement can be attributed to the adaptive system dynamics model used in AMPC, which allows for real-time adjustment of control strategies in response to changes in the system. Therefore, the control performance of AMPC is superior to that of basic MPC by considering both indoor air quality and thermal comfort.

Based on the simulation results, the AMPC algorithms were deployed into the “Live Lab” for physical experiment testing. To deploy the learning algorithms in the Lab, the past data of the last 150 minutes is downloaded from the RCS, which includes the room temperature of the target and adjacent zones, zone CO2 level, outdoor dry-bulb temperature, wind direction, wind speed, solar radiation, and window opening percentage. The forecast data for the next 300 minutes is downloaded from the NOAA API web service.

The hourly weather forecast data includes outdoor dry-bulb temperature, wind direction, wind speed, and short forecast. Two linear models are trained using historical weather data from a known nearby weather station, in this instance Boston Logan International Airport and the local weather station to calibrate wind speed and solar radiation. The models localize wind speed and calculate solar radiation from time and from the short forecast given in the weather forecast. The commands for the next 15 minutes are sent to actuators via RCS.

Figure 9:
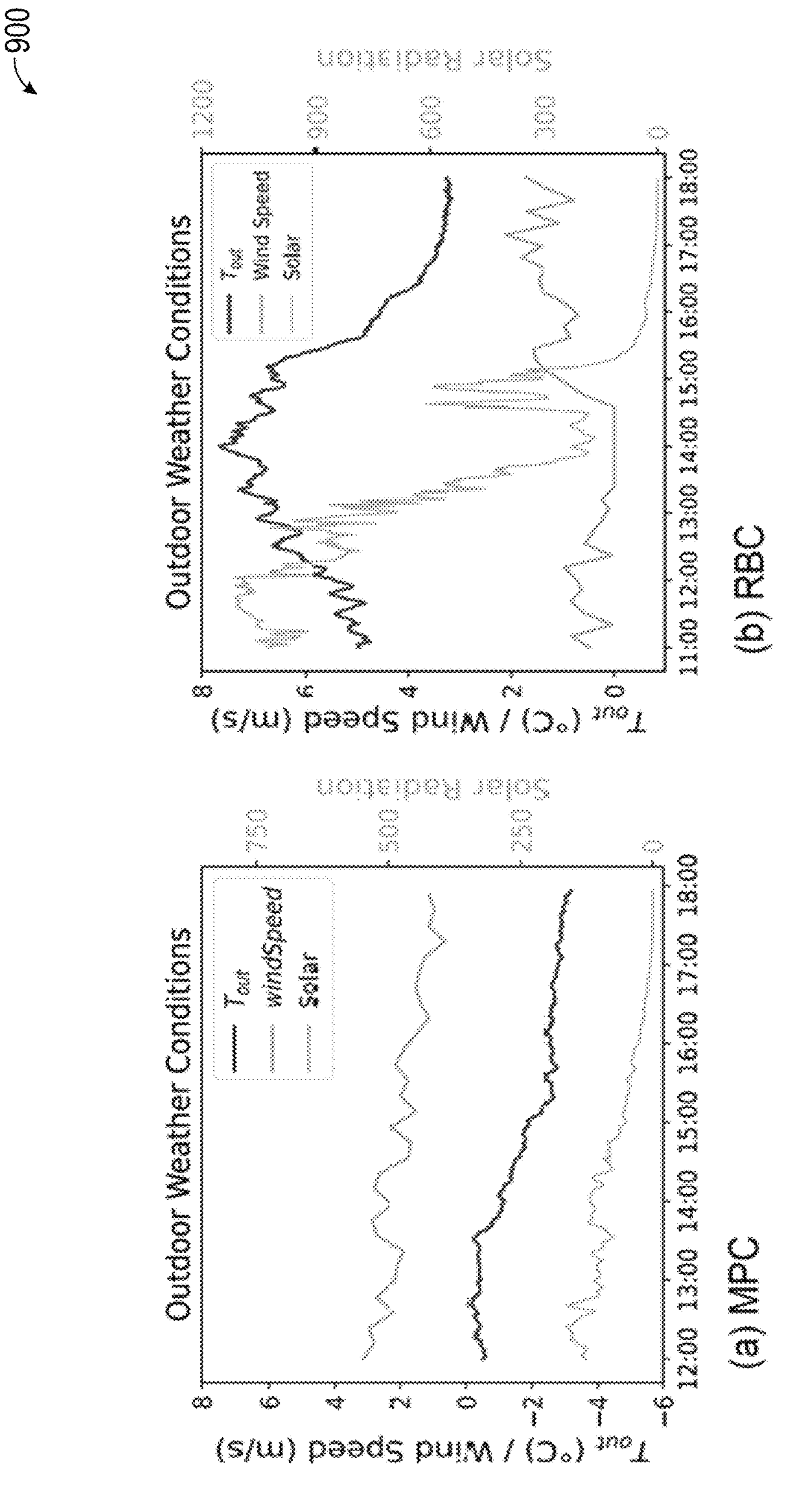
FIG. 9 shows outdoor weather conditions of an experiment day for model predictive control ("MPC"), and rule based control ("RBC") in accordance with one aspect of the present disclosure.

The lab experiments involved the implementation of two different control algorithms: AMPC as a learning-based algorithm and the RBC as a baseline. Example outdoor weather conditions 900 on the two experiment days are depicted in FIG. 9, according to some embodiments. FIG. 9 (*a*) shows that during the MPC experiment, the air temperature fell in a range between −3° C. to 0° C., and the solar radiation was very low. These conditions indicate a very cold outdoor environment with limited solar heat gain to assist with regulating the indoor air temperature. The RBC was tested on a day with comparatively higher outdoor air temperature and solar radiation, as shown in FIG. 9 (*b*).

Figure 10:
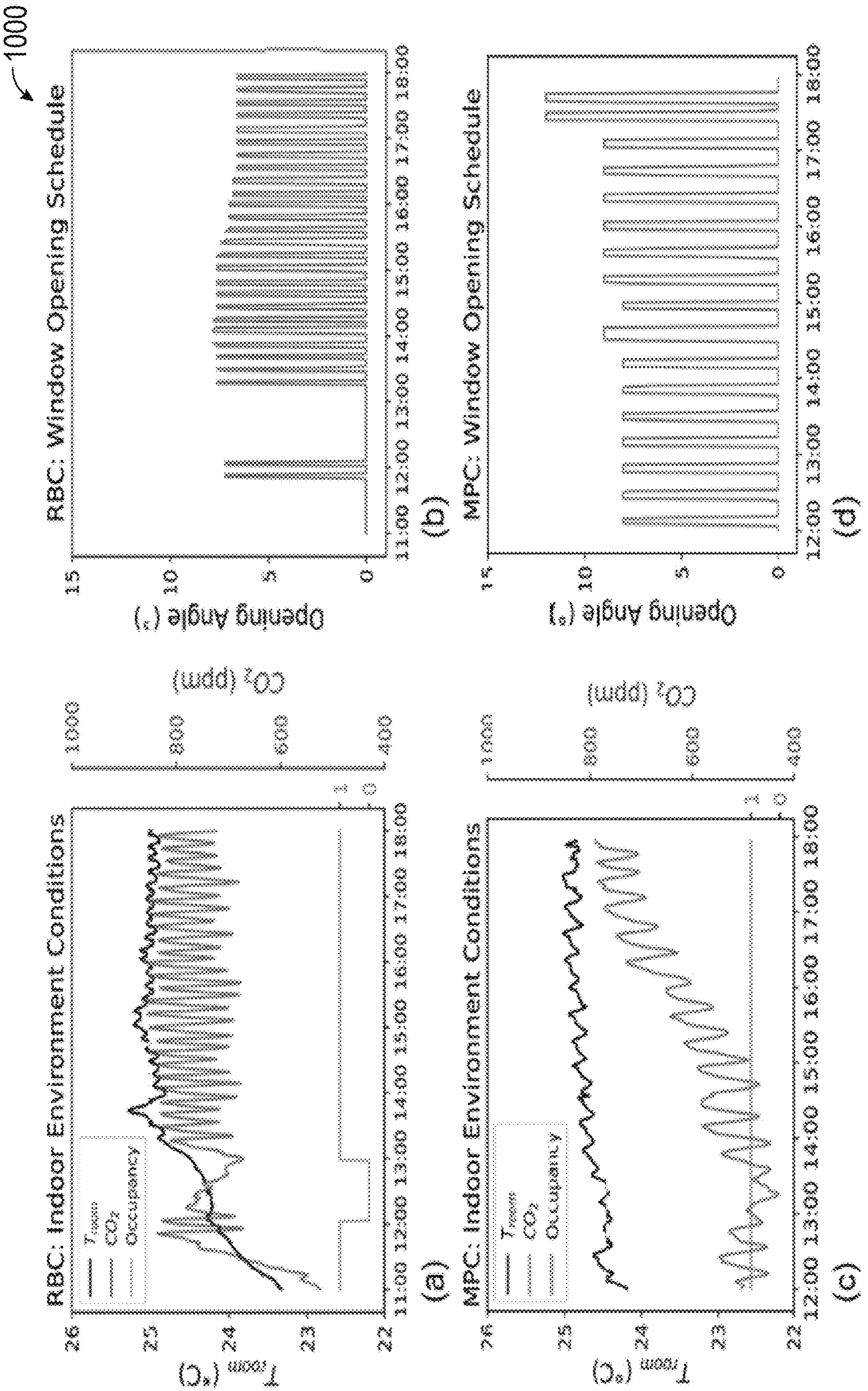
FIG. 10 shows experimental performance data of RBC and MPC algorithms on physical 'Live Lab' in accordance with one aspect of the present disclosure.

Experiment results 1000 with the RBC and MPC in two workdays are shown in FIG. 10. For RBC, with having the window operation schedule and opening degree (FIG. 10 (*b*)), the indoor air temperature (FIG. 10 (*a*)) is well-controlled and maintained within the comfortable range of 23° C. to 25° C., and most of the occupied hours were maintained around 25° C. However, an analysis of CO2 levels (FIG. 10 (*a*)) revealed that during 31.2% of occupied hours, the concentration exceeded 800 ppm. For AMPC, by implementing the window operation schedule (FIG. 10 (*d*)), the indoor environment is effectively maintained at a stable and comfortable condition, both in terms of indoor air quality and thermal comfort. As shown in (FIG. 10 (*c*)), the variation of indoor air temperature stays within the range between 24° C. to 25° C., while the CO2 concentration is always remained below 800 ppm throughout the occupied hours.

In terms of energy efficiency, due to the delay of heat transfer from hot water in the radiant heating system to indoor air, the average heating loads between 8 AM on the day of the experiment and 8 AM on the following day are calculated. The heating loads of RBC and AMPC are found to be 0.177 kW and 0.197 kW, respectively. Given the outdoor weather conditions on the RBC experiment day was warmer, it is reasonable to conclude that AMPC with multi-objective control optimization is effective in significantly improving the indoor environment without compromising energy consumption.

Example Data-Informed Building Energy Management

Enabled by an IoT architecture, a data-informed building energy management (DiBEM) framework may be used improve energy efficiency in the building. In experimentation, an exemplary DiBEM framework was found to lead to an energy use intensity (EUI) reduction from 54.1 kWh/m2 to 42.8 kWh/m2 [18]. A DiBEM framework, as disclosed herein, aims to provide a lightweight, easy-to-implement, and semi-automatic solution to help buildings improve operational energy efficiency through the automatically generated regular energy report with data-driven model predictions as references.

The DiBEM framework may automatically identify the energy-saving potential or system operation faults through data and models. In addition to a simple analytic model (e.g., linear regression model), which can be directly implemented on the BAS-2 system, it also supports complex machine learning models to be involved in the DiBEM via communication between the BAS-2 system and the research server through API. An alert of system faults will be sent to the building operators through emails, who will then investigate the issues and act accordingly. This timely notification based on close monitoring of the building performance helps maintain high energy efficiency throughout the operation phase.

Figure 11:
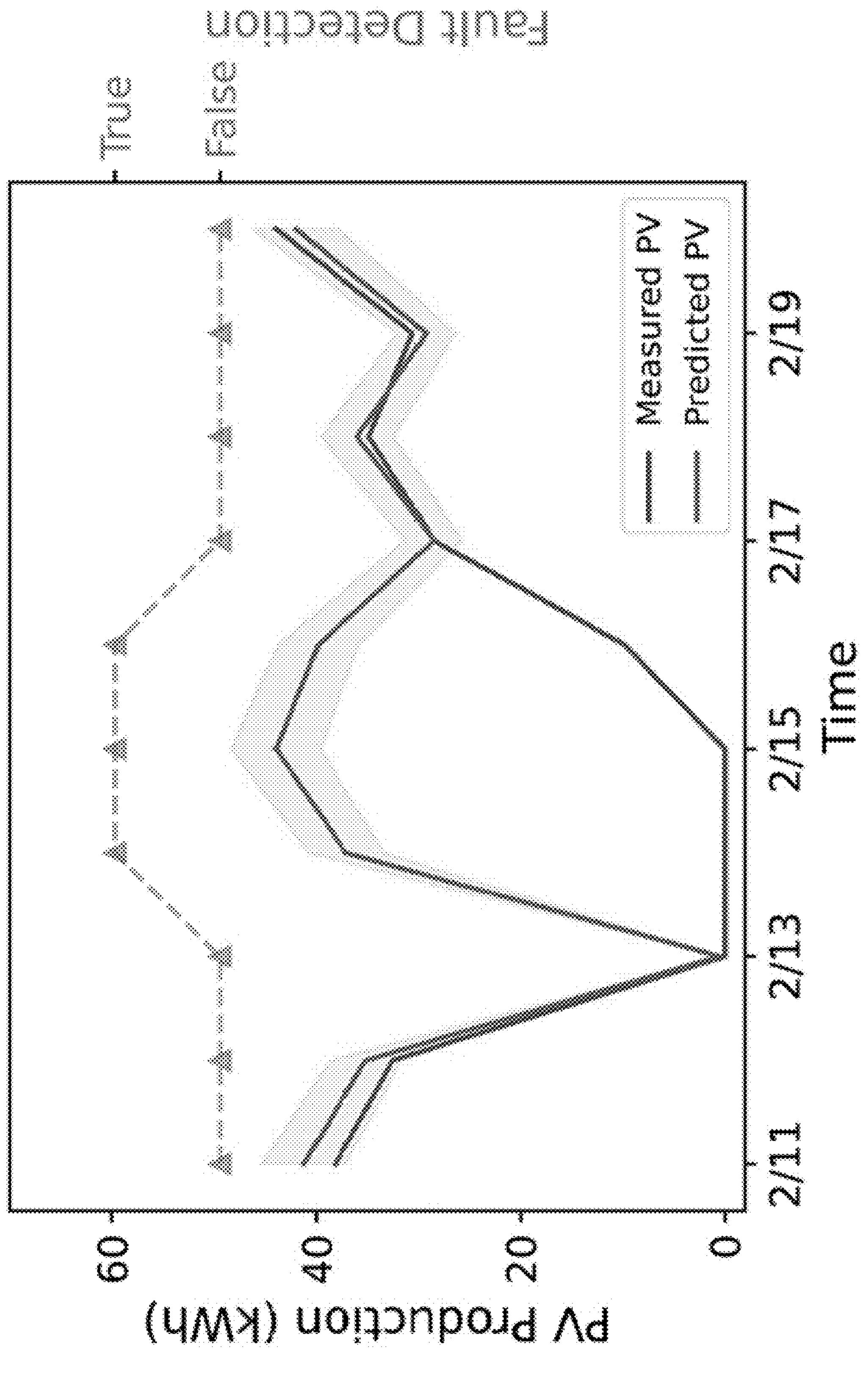
FIG. 11 shows a graph plot 1100 of an example model-based automatic fault detection for the PV system, in accordance with one aspect of the present disclosure.

FIG. 11 shows a graph plot 1100 of an example model-based automatic fault detection for the PV system, according to some embodiments. A polynomial regression model was developed using historical data to predict the PV production based on solar radiation data. The model prediction was utilized as a reference to identify the abnormal operation of the PV system. As shown in FIG. 11, it was found that on February 14th and 15th, the measured PV production was much lower than the reference threshold, which indicated that there may be some issues in the PV system. This alert was sent to building operators and further measures will be done after looking into the system issues.

Example Augmented Reality Enhanced Building Operations and Facility Management

Figure 12:
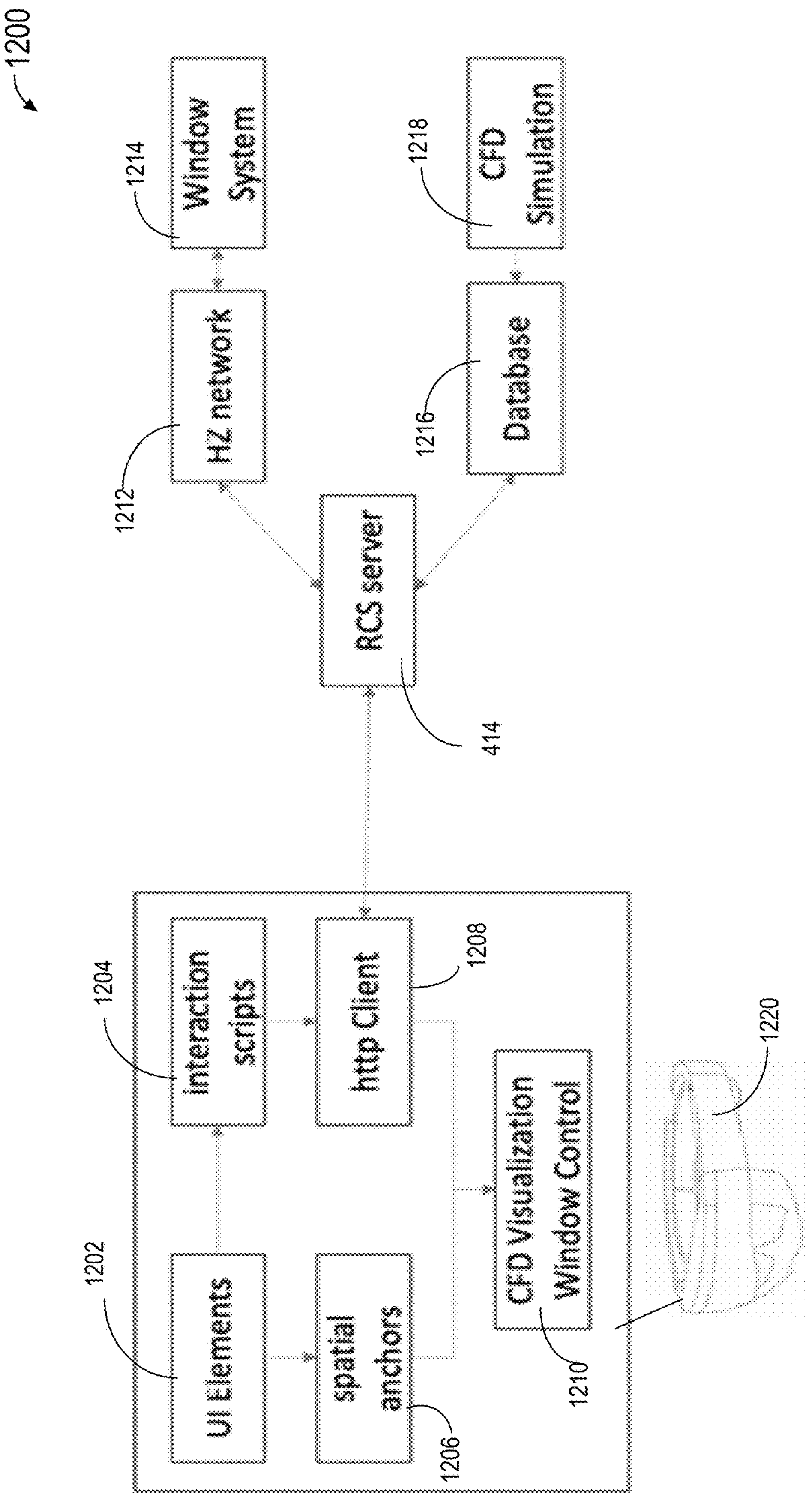
FIG. 12 is a schematic diagram of a system for augmented reality (AR) applications based on the building infrastructure and/or IoT architecture described above, according to some embodiments in accordance with one aspect of the present disclosure.

FIG. 12 is a schematic diagram of a system 1200 for augmented reality (AR) applications based on the building infrastructure and/or IoT architecture described above, according to some embodiments. Based on the IoT architecture described above, AR-based experimentation and deployment may be performed. AR enables the superimposition of annotations, information from sensors, or information from simulations to the physical world. AR facilitates the inspection of individual systems of the building and allows information to be visualized in selected real-world locations, providing a seamless connection of the digital with the physical. A series of AR applications may be used, which may in some embodiments be developed using the gaming engine Unity 3D and targeting a commercial headset. FIG. 12 illustrates the structure of the AR applications and the communication with other components at HouseZero, according to some embodiments. Three-dimensional models and UI elements 1202 may be permanently aligned to the appropriate real-world locations using spatial anchors 1206. The headset applications (e.g., CFD visualization window control 1210) can access HouseZero systems and other research frameworks through the RCS server 414, via an HTTP client 1208.

Figure 13:
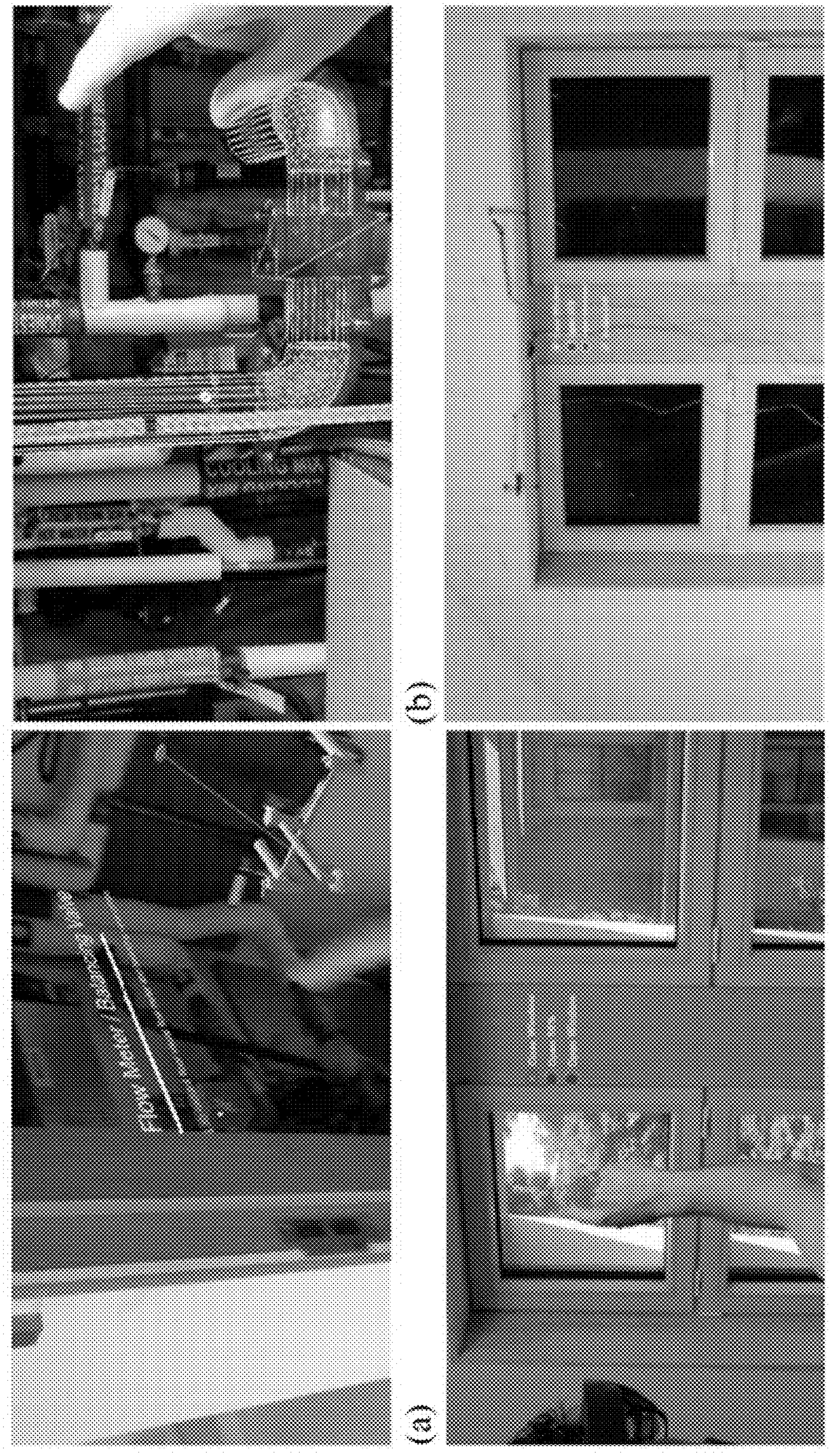
FIG. 13 shows example AR-based building operations and facility management, in accordance with one aspect of the present disclosure.

FIG. 13 shows example AR-based building operations and facility management 1300 using the infrastructure described above, according to some embodiments. An example application focuses on the identification and localization of hardware components that are a part of complex assemblies. More specifically, a location with plumbing systems was selected (Tech Closet). A high-accuracy, three-dimensional model of the plumbing was obtained using laser scanning. Using Unity 3D, a series of scripts 1204 were attached to the geometries to handle proper real-world alignment and user interaction. In the resulting application, the 3d models remain invisible, except for when they are interacted with. The AR app may afford interactions through gaze, gestures, and speech. A user may request an item identification and description by looking or tapping on an object; a label will appear next to the targeted object. A user can easily localize an item by either selecting it from a list or using a voice command; the corresponding object will be highlighted in the AR view, as shown in FIGS. 13 (*a*) and (*b*).

Another application concerns the control of selected systems of the building through an AR interface. More specifically, the windows in the Lab area (shown as window system 1214) can be controlled, via HouseZero network 1212 (e.g., via the operations network 214 and/or the research network 212). The headset application implements an HTTP client 1208 that communicates with the RCS server 414 to receive the real-time window state (e.g. 50% open) and to request a new window state (e.g. closed), as shown in FIG. 13 (*c*).

Another application may be used to visualize airflows inside the building, which may occur as a result of the windows control. To make this possible, a synchronized digital twin of the Lab space may be used to compute CFD simulations 1218, e.g. in real time. Data derived from the simulations may be recorded in a database 1216, e.g. as soon as they are computed. The headset application 1210 may then obtain the CFD data through the RCS server 414, which may occur using HTTP requests (via the HTTP client 1208). Air flow data may be visualized as a grid of animated wind velocities colored by temperature, using OpenGL visualizations as shown in FIG. 13 (*d*).

In addition to the use of IoT to operate and experience buildings better, it can provide a ground for experimentation of new approaches that utilize data.

One potential use of the IoT architecture herein disclosed, is to research the development of a replicable cloud-hosted, open-source, real-time, sensor-based, data-driven heating/cooling/ventilation control system with machine-learning technology. Another potential use may include experimentation with new frameworks for energy management and analysis, as well as enhanced data management and visualization.

The building's prototype 'Live Lab' testbed, geothermal heat pump and possible solar hot water exchange (one zone), natural ventilation, and motorized windows (two windows), may be used under the control of code developed on the Research Server RCS. The code enables algorithmic data-driven control of thermal performance through direct READ- and WRITE-controls to selected sensors and actuators. It may also enable the retrieval and sharing of selected real-time and historic data sets, including retrieval and sharing through secure internet connection to remote researchers and collaborators. These use cases may include:

- BACNet/KNX Gateway, required for interconnect/communications to/from sensors and devices.
- Window Control Server, required for the 'black-box' proprietary algorithm for heating/cooling control.
- BAS-2, required for data transfer, storage, and display.
- RCS Research Server, used for code/software development and experimentation.
- 'Live Lab' Testbed, with modular design and independent control for heating, cooling, and ventilation.
- New experimental data-driven control system on RCS server, controlling one zone and all windows in the 'Live Lab.'

The above may be combined, which may lead to the development of open-source, data-driven control that can be deployed across zones, as well as full-building control of all heating, cooling, and ventilation.

Motorized windows may in some embodiments use the KNX protocol for communications, and other sensors and wiring interconnections may use BACNet. Accordingly, the layer of the BACNet-KNX Gateway may be needed for communication. This may ultimately results in replacing the mediation of commercial window operation control and heat-pump operational control with direct calls from the RCS code to the underlying sensors, pumps, valves, and motor assemblies.

The IoT architecture may also allow for experimentation with the development of a new framework for energy management and analysis. Automation of such a framework can also be possible, which could lead to optimizing energy consumption. Data visualization and user-building interaction can also be enhanced using this architecture, with the capacity to fuse real and simulated data and information to enhance the occupants' experience in the building and optimize its performance.

The disclosure hereof demonstrates a capacity to harness data for better operation and user interaction of buildings. The application in a naturally ventilated building illustrated its utility as an enabler for better control of passive approaches, including thermal mass. Automation and learning-based, data-driven control can potentially provide scalability. The IoT architecture discussed with the unique coupling of operation and research networks illustrated how such control can be developed. Researching best algorithms for such control along with sensor characteristics, placement, and minimum numbers required to generate the required data will be needed. The IoT architecture also illustrated its capacity to utilize real data and synthetic data for the goal of optimal building operation and performance.

Example Systems for Environmental Control in a Building

An example system for environmental control in a building (e.g., the building shown in FIG. 1) is described herein, according to some embodiments. In some embodiments, the system (e.g., the system 400) may include a plurality of sensors including operational sensors (e.g., the sensors of the physical sensors and networks 406) and data gathering sensors (e.g., the sensors of the physical sensor and actuators 408), and a plurality of actuators (e.g., the actuators of physical sensor and actuators 406 and the actuators of the physical sensor and actuators 408). Example sensors and sensor networks are described above, according to some embodiments. The system may also include a rule-based server (e.g., the BAS-1 system 402) and a data-driven server (e.g., the BAS-2 system 404, the research server 414), coupled to the plurality of sensors and the plurality of actuators. The rule-based server may be configured to receive operation signals from the operational sensors, and control operation of the plurality of actuators according to one or more rules based on the operation signals. Example operations and rules are described above in the section on example data-driven control experimentation. The data-driven server may be configured to receive data signals from the data-gathering sensors and the operation signals from the operational sensors, apply one or more predictive models to the data signals and the operation signals to predict performance changes in the building due to a command, and/or in accordance with a determination that the performance changes meet a predetermined criteria, control operations of the plurality of actuators according to the command. Details of the example system are described above in reference to FIGS. 1-13, according to some embodiments.

In some embodiments, the data-driven server and the rule-based server may be configured to control operation of the plurality of actuators concurrently during a first time period (e.g., during a first 2 hours), and the data-driven server may be configured to control operation of the plurality of actuators exclusively during a second time period (e.g., after the first 2 hours, for several hours). For example, the BAS-1 server and the BAS-2 server of the system 400 may control operation of the actuators 406 and/or the actuators 408 for the first 2 hours, and subsequently the BAS-2 server takes over operation of the actuators.

In some embodiments, the rule-based server may be configured to cease operating or to cease controlling operation of the plurality of actuators after a predetermined time period (e.g., during a second time period). For example, the BAS-1 server is decommissioned and/or ceases control of the actuators 406 and/or the actuators 408, after 2 hours, experimentation is complete, performance meets a threshold, and/or results are validated.

In some embodiments, the data-driven server is configured to control operation of a subset of the plurality of actuators for a zone of the building, multiple zones of the building, or the entire building, for a first time period, along with the rule-based server. The subset may include the whole of the plurality of actuators. The data-driven server may be configured to control operation of the subset of the plurality of actuators for the zone of the building or multiple zones of the building or the entire building exclusively during a second time period. For example, FIG. 1 shows three floors of the building 100. During a first 2 hour period, the data-driven server (e.g., the BAS-2 server, FIG. 4) and the rule-based server (e.g., the BAS-1 server) control the third floor. Subsequently, the data-driven server controls all or portion of the building 100 exclusively for the next several hours.

In some embodiments, the data-driven server may be configured to: retrieve data points in real-time or historical trends from the data signals, the operation signals, and/or control signals; use a machine learning model (e.g., Long-Short-Term Memory (LSTM) deep learning model) for identifying thermal dynamics and CO2 trends, based on the data points; and apply a multi-objective optimization function that optimizes indoor air quality, thermal comfort, and energy efficiency for the building, based on the thermal dynamics and CO2 trends, to predict the performance changes in the building 100 due to the command. Examples of these operations and/or configurations are described above in the section titled Example Data-driven Control Experimentation.

In some embodiments, the data-driven server may be configured to determine if the performance changes meet the predetermined criteria by (i) simulating issuing the command to control operations of the plurality of actuators using a virtual model of the building (e.g., the virtual testbed 502, FIG. 5) and/or (ii) issuing the command to control operations of a portion of the building (e.g., the physical testbed 504).

In some embodiments, the virtual model may include buildings that are of different types and/or have different locations compared to the building. For example, the building 100 is shown to have a basement (the portion of the building with the heat pump 114, the network closet 116), a floor for administration 122, a floor for research workstations 120, and an attic for semi-isolated research lab 118). The virtual model may include similar types of floors, and/or may include different outdoor characteristics and/or locations (e.g., hotter and/or wetter environment).

In some embodiments, the rule-based server and the data-driven server are different. For example, in FIG. 4, the BAS-1 server, the BAS-2 server, and the research server 414 are shown as different servers. In some embodiments, the rule-based server and the data-driven server are identical. For example, the BAS-1 server, the BAS-2 server, and/or the research server may be implemented on a single server.

In some embodiments, the system may further include a building monitoring and visualization server (e.g., a building monitoring database and visualization device) configured to monitor and visualize performance of the building. For example, in FIG. 12, the RCS server 414 may operate or may be configured to operate as a building monitoring and visualization server, to monitor the building 100 and visualize (e.g., perform CFD simulation 1218, and/or generate CFD visualization window control 1210).

In some embodiments, the rule-based server and the data-driven server may be configured on one or more restricted access secure virtual local area networks (VLANs) (e.g., VLAN 1 or VLAN 2, FIG. 2) to prevent access from outside the building.

In some embodiments, the rule-based server (e.g., the BAS-1 server, FIG. 4) and the operational sensors (e.g., the sensors of the physical sensors and actuators 406) may be configured to communicate via a first network (e.g., the KNX network, FIG. 4). The data-driven server (e.g., the BAS-2 server) and the data gathering sensors (e.g., the sensors of the physical sensors and actuators 408) may be configured to communicate via a second network (e.g., the BACnet network) that is separate and distinct from the first network.

In some embodiments, the first network and the second network may be networks based on serial protocols that allow daisy-chaining of devices.

In some embodiments, the first network is KNX network and the second network is BACnet network.

In some embodiments, the first network and the second network may be connected via one or more gateways (e.g., the serial gateways 410).

In some embodiments, the operational sensors may include sensors for indoor slab and air temperatures, local zone thermostats, CO2 sensors to evaluate occupancy, and/or one or more local weather station sensors for outdoor temperature and/or rain.

In some embodiments, the plurality of sensors may include at least some sensors that acquire signals at different frequencies and intervals than other sensors. For example, the indoor slab and air temperature sensors may operate every few minutes, whereas local weather station sensors may operate every hour or so.

In some embodiments, the rule-based server may be configured to control heating and cooling operation of a geothermal heat-pump (e.g., the heat pump 114), motorized windows (e.g., the motorized windows 110), and/or solar thermal vent (e.g., the vent 108) of the building.

In some embodiments, the rule-based server may be configured to control actuation of motorized windows (e.g., the motorized windows 110) based on CO2, occupancy sensors, and/or heating or cooling from a geothermal heat pump based on zone thermostats.

In some embodiments, the data-driven server may be configured to monitor the plurality of sensors, control one or more actuators of the plurality of actuators, store sensor data from the plurality of sensors for analysis, command heating and cooling, and/or connect to one or more external building automation systems.

In some embodiments, the data gathering sensors may include finer-grained sensors and a more extensive set of sensors than the operational sensors, including both low-height (below the knee) and high-height (above the head) temperature sensors, configured to detect stratification in various spaces, and/or low-velocity air-motion sensors configured to detect air movement and buoyancy-effect drafts throughout structure of the building as well as calibrate simulation measurements.

In some embodiments, the data gathering sensors may include BTU-sensors attached to several heating zones, tubing, manifolds, and valves to monitor distribution of heat along with fluid flows and temperatures.

In some embodiments, each electrical circuit in the structure may be independently metered (e.g., electrical circuit metering 424, FIG. 4), as is each solar panel, to measure its energy usage over time.

In some embodiments, the data gathering sensors may further include a redundant whole-house energy usage meter (e.g., electrical circuit metering 424, FIG. 4) configured to monitor an aggregate of individual energy readings.

In some embodiments, the system may further include an augmented reality headset (e.g., the headset 1220, FIG. 12) configured to show information from at least one of the plurality of sensors, while a wearer of the augmented reality headset visually observes the inside of the building.

In some embodiments, the augmented reality headset may be further configured to allow the wearer to issue a command (e.g., via the CFD visualization window control 1210) for controlling at least one of the plurality of actuators.

In another aspect, a system for environmental control in a building (e.g., the building 100) is provided herein, according to some embodiments. The system includes an operations subsystem (e.g., the subsystem 402, FIG. 4) and a data analysis subsystem (e.g., the subsystem 404). The operations subsystem may include a plurality of operations environmental sensors (e.g., sensors of the physical sensors and actuators 406) configured to measure climate-related statistics inside or proximate to the building, a plurality of environmental actuators (e.g., actuators of the physical sensors and actuators 406), and an operations server (e.g., the BAS-1 server). The operations server may be operatively coupled to the plurality of environmental actuators, and configured to transmit commands to any of the plurality of environmental actuators to change a climate condition in the building. The commands are issued in accordance with at least one rule. The data analysis subsystem may include a plurality of data analysis environmental sensors (e.g., sensors of the physical sensors and actuators 408) configured to measure climate-related statistics inside or proximate to the building, and a data analysis server (e.g., the BAS-2 server, the research server 414) communicatively coupled to the plurality of data analysis environmental sensors and the operations server. The data analysis server may be configured to: monitor readings from the plurality of operations environmental sensors and from the plurality of data analysis environmental sensors; transmit a command to the operations server to change a setting on one of the plurality of environmental actuators, the setting relating to a climate condition in the building; gather data from a portion of the plurality of operations environmental sensors or a portion of the plurality of data analysis environmental sensors, to determine a climate effect and an energy usage effect, in the building, after sending the command; and use the climate effect, the energy usage effect, and the command to generate or train a data driven model for generating future commands to change future settings on the plurality of environmental actuators.

In some embodiments, the command is a first command, and the data analysis subsystem may further include a plurality of data analysis environmental actuators, coupled to the data analysis server and confined to a separate section of the building (e.g., third floor of the building 100). The data analysis server may be further configured to: transmit a second command to one of the plurality of data analysis environmental actuators, effective to modify a setting relating to at least one of the second plurality of environmental actuators; gather data from at least one of the second plurality of environmental sensors that is present in the separate section of the building; determine a second climate effect on the separate section of the building, caused by the second command; and use the second climate effect, and the second command to generate or train the data driven model.

In some embodiments, the operations subsystem may further include an operations network, wherein the operations network uses a KNX protocol.

In some embodiments, the data analysis subsystem may further include a data analysis network, wherein the data analysis network uses a building automation and control network (BACnet) protocol.

In some embodiments, the operations network and the data analysis network may be configured to communicate via a gateway (e.g., the gateway 410), and the gateway may be configured to translate between the KNX protocol and the BACnet protocol.

In some embodiments, the data analysis server may be configured to receive a measurement from at least one of the plurality of operations environmental sensors or from at least one of the plurality of data analysis environmental sensors, every sixty seconds.

In some embodiments, the system may include an augmented reality headset (e.g., the headset 1220) configured to show information from at least one of the plurality of operations environmental sensors, or from at least one of the plurality of data analysis environmental sensors, while a wearer of the augmented reality headset visually observes the inside of the building.

In some embodiments, the data driven model may include a geometric model of the building.

Figure 14:
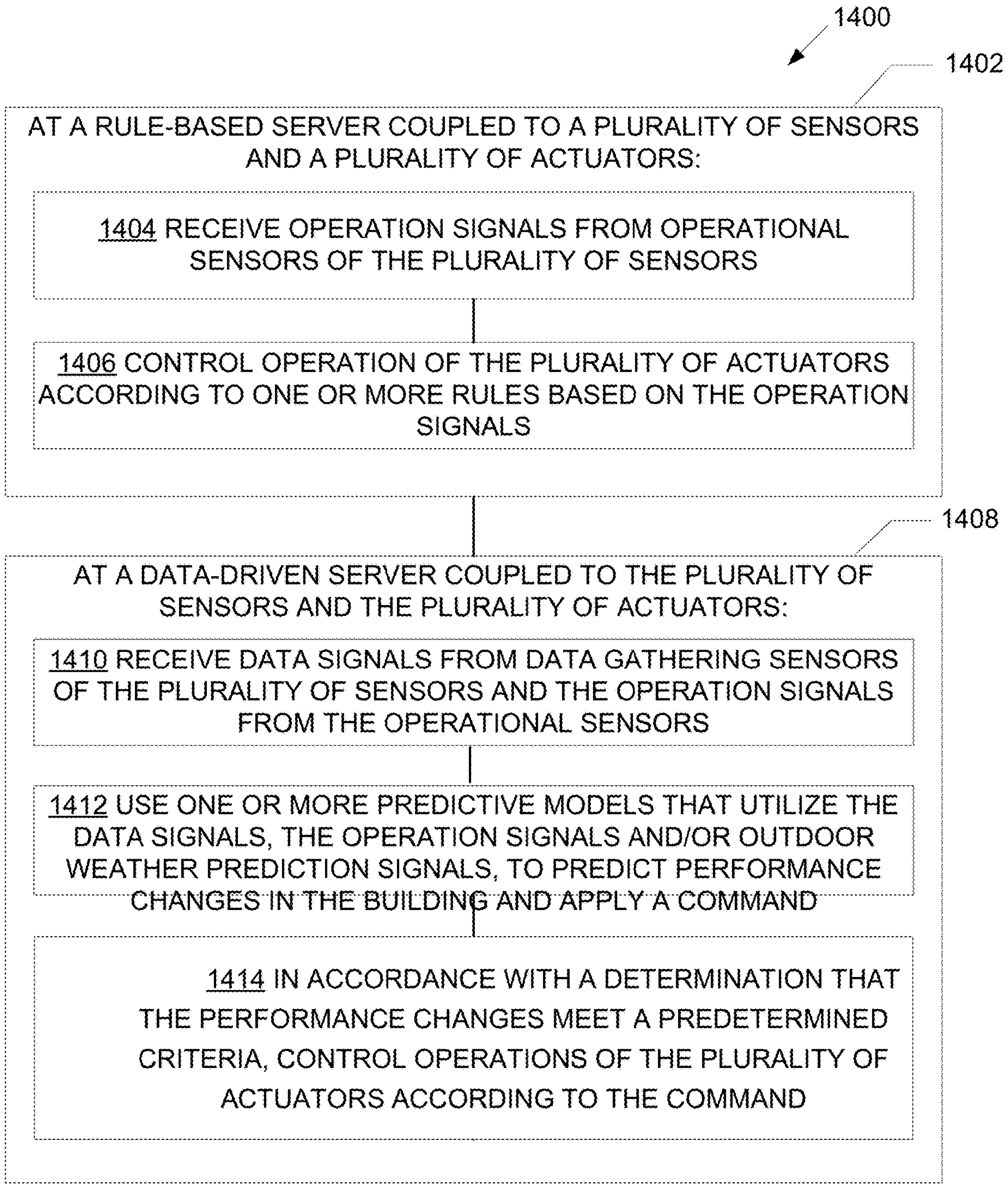
FIG. 14 is a flowchart of an example method for environmental control in a building, according to some embodiments.

FIG. 14 is a flowchart of an example method 1400 for environmental control in a building, according to some embodiments. The method may be performed by the system 400 (FIG. 4). The method may include, performing (1402) at a rule-based server (e.g., BAS-1) coupled to a plurality of sensors and a plurality of actuators (e.g., sensors and actuators of the physical sensors and actuators 406 and the physical sensors and actuators 408): receiving (1404) operation signals from operational sensors of the plurality of sensors; and controlling (1406) operation of the plurality of actuators according to one or more rules based on the operation signals. Example operations and rules are described above in the section on example data-driven control experimentation. The method also includes, performing (1408) at a data-driven server (e.g., the BAS-2 server, the research server 414) coupled to the plurality of sensors and the plurality of actuators: receiving (1410) data signals from data gathering sensors of the plurality of sensors and the operation signals from the operational sensors; applying (1412) one or more predictive models to the data signals and the operation signals to predict performance changes in the building due to a command; and/or in accordance with a determination that the performance changes meet a predetermined criteria, controlling (1414) operations of the plurality of actuators according to the command. Details of the example method are described above in reference to FIGS. 1-13, according to some embodiments.

In some embodiments, the method may include, at the data-driven server and the rule-based server, during a first time period (e.g., during a first 2 hours), concurrently controlling operation of the plurality of actuators; and at the data-driven server, during a second time period (e.g., after the first 2 hours, for several hours), exclusively controlling operation of the plurality of actuators. For example, the BAS-1 server and the BAS-2 server of the system 400 may control operation of the actuators 406 and/or the actuators 408 for the first 2 hours, and subsequently the BAS-2 server takes over operation of the actuators.

In some embodiments, the method may include, at the rule-based server, ceasing operating or ceasing controlling operation of the plurality of actuators after a predetermined time period (e.g., during a second time period). For example, the BAS-1 server is decommissioned and/or ceases control of the actuators 406 and/or the actuators 408, after 2 hours, experimentation is complete, performance meets a threshold, and/or results are validated.

In some embodiments, the method may include, at the data-driven server and the rule-based server, controlling operation of a subset of the plurality of actuators for a zone of the building, multiple zones of the building, or the entire building, for a first time period. The method may also include, at the data-driven server, controlling operation of the subset of the plurality of actuators for the zone of the building or multiple zones of the building or the entire building exclusively during a second time period. For example, FIG. 1 shows three floors of the building 100. During a first 2 hour period, the data-driven server (e.g., the BAS-2 server, FIG. 4) and the rule-based server (e.g., the BAS-1 server) control the third floor. Subsequently, the data-driven server controls all or portion of the building 100 exclusively for the next several hours.

In some embodiments, the method may include, at the data-driven server: retrieving data points in real-time or historical trends from the data signals, the operation signals, and/or control signals; using a machine learning model (e.g., Long-Short-Term Memory (LSTM) deep learning model) for identifying thermal dynamics and CO2 trends, based on the data points; and/or applying a multi-objective optimization function that optimizes indoor air quality, thermal comfort, and energy efficiency for the building, based on the thermal dynamics and CO2 trends, to predict the performance changes in the building 100 due to the command. Examples of these operations and/or configurations are described above in the section titled Example Data-driven Control Experimentation.

In some embodiments, the method may further include, at the data-driven server: determining if the performance changes meet the predetermined criteria by (i) simulating issuing the command to control operations of the plurality of actuators using a virtual model of the building (e.g., the virtual testbed 502, FIG. 5) and/or (ii) issuing the command to control operations of a portion of the building (e.g., the physical testbed 504).

In some embodiments, the virtual model may include buildings that are of different types and/or have different locations compared to the building. For example, the building 100 is shown to have a basement (the portion of the building with the heat pump 114, the network closet 116), a floor for administration 122, a floor for research workstations 120, and an attic for semi-isolated research lab 118). The virtual model may include similar types of floors, and/or may include different outdoor characteristics and/or locations (e.g., hotter and/or wetter environment).

In some embodiments, the method may further include, at a building monitoring database and visualization device, monitoring and visualizing performance of the building. For example, in FIG. 12, the RCS server 414 may operate or may be configured to operate as a building monitoring and visualization server, to monitor the building 100 and visualize (e.g., perform CFD simulation 1218, and/or generate CFD visualization window control 1210).

In some embodiments, the rule-based server and the data-driven server may be configured on one or more restricted access secure virtual local area networks (VLANs) (e.g., VLAN 1 or VLAN 2, FIG. 2) to prevent access from outside the building.

In some embodiments, the rule-based server (e.g., the BAS-1 server, FIG. 4) and the operational sensors (e.g., the sensors of the physical sensors and actuators 406) may communicate via a first network (e.g., the KNX network, FIG. 4), and the data-driven server and the data gathering sensors may communicate via a second network (e.g., the BACnet network) that is separate and distinct from the first network.

In some embodiments, the first network may be a Konnex (KNX) network and the second network may be a BACnet network.

In some embodiments, the operational sensors include sensors for indoor slab and air temperatures, local zone thermostats, CO2 sensors to evaluate occupancy, and/or one or more local weather station sensors for outdoor temperature and/or rain.

In some embodiments, the plurality of sensors may include at least some sensors that acquire signals at different frequencies and intervals than other sensors. For example, the indoor slab and air temperature sensors may operate every few minutes, whereas local weather station sensors may operate every hour or so.

In some embodiments, the method includes, at the data-driven server, monitoring the plurality of sensors, controlling one or more actuators of the plurality of actuators, storing sensor data from the plurality of sensors for analysis, commanding heating and cooling, and/or connecting to one or more external building automation systems.

In some embodiments, the data gathering sensors may include finer-grained sensors and a more extensive set of sensors than the operational sensors, including both low-height and high-height temperature sensors, and low-velocity air-motion sensors. The method may include, at the low-height and high-height temperature sensors, detecting stratification in various spaces; and at the low-velocity air-motion sensors, detecting air movement and buoyancy-effect drafts throughout structure of the building as well as calibrate simulation measurements.

In some embodiments, the data gathering sensors may include BTU-sensors attached to several heating zones, tubing, manifolds, and valves to monitor distribution of heat along with fluid flows and temperatures.

In some embodiments, each electrical circuit in the structure may be independently metered (e.g., electrical circuit metering 424, FIG. 4), as is each solar panel, to measure its energy usage over time.

In some embodiments, the data gathering sensors may further include a redundant whole-house energy usage meter (e.g., electrical circuit metering 424, FIG. 4). The method may further include, at the redundant whole-house energy usage meter, monitoring an aggregate of individual energy readings.

In some embodiments, the method may further include, at an augmented reality headset (e.g., the headset 1220, FIG. 12), showing information from at least one of the plurality of sensors, while a wearer of the augmented reality headset visually observes an inside of the building.

In some embodiments, the method may further include, at the augmented reality headset, allowing the wearer to issue a hand gesture command (e.g., via the CFD visualization window control 1210) for controlling at least one of the plurality of actuators.

Figure 15A:
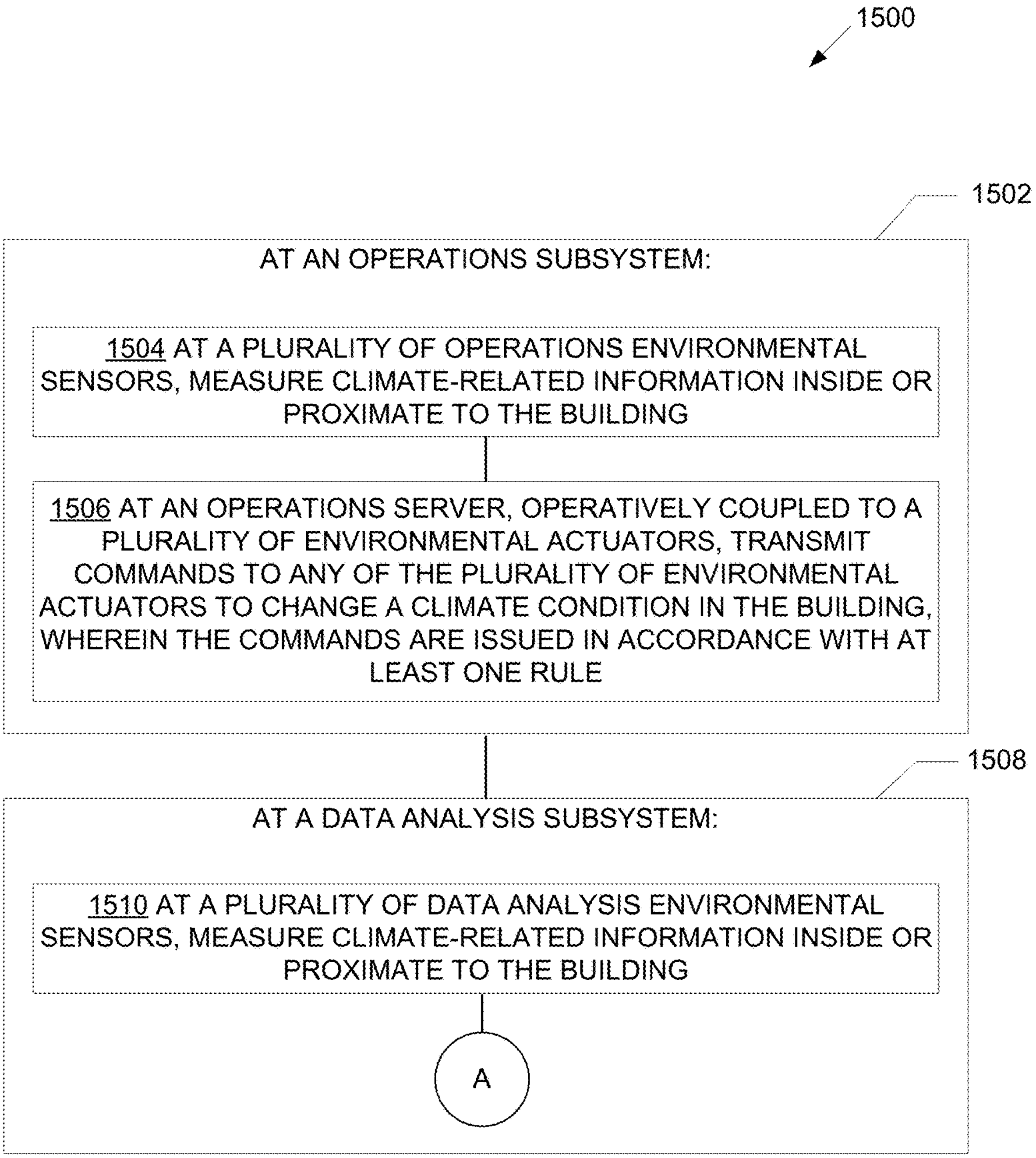
FIGS. 15A and 15B show a flowchart of another example method for environmental control in a building, according to some embodiments.
Figure 15B:
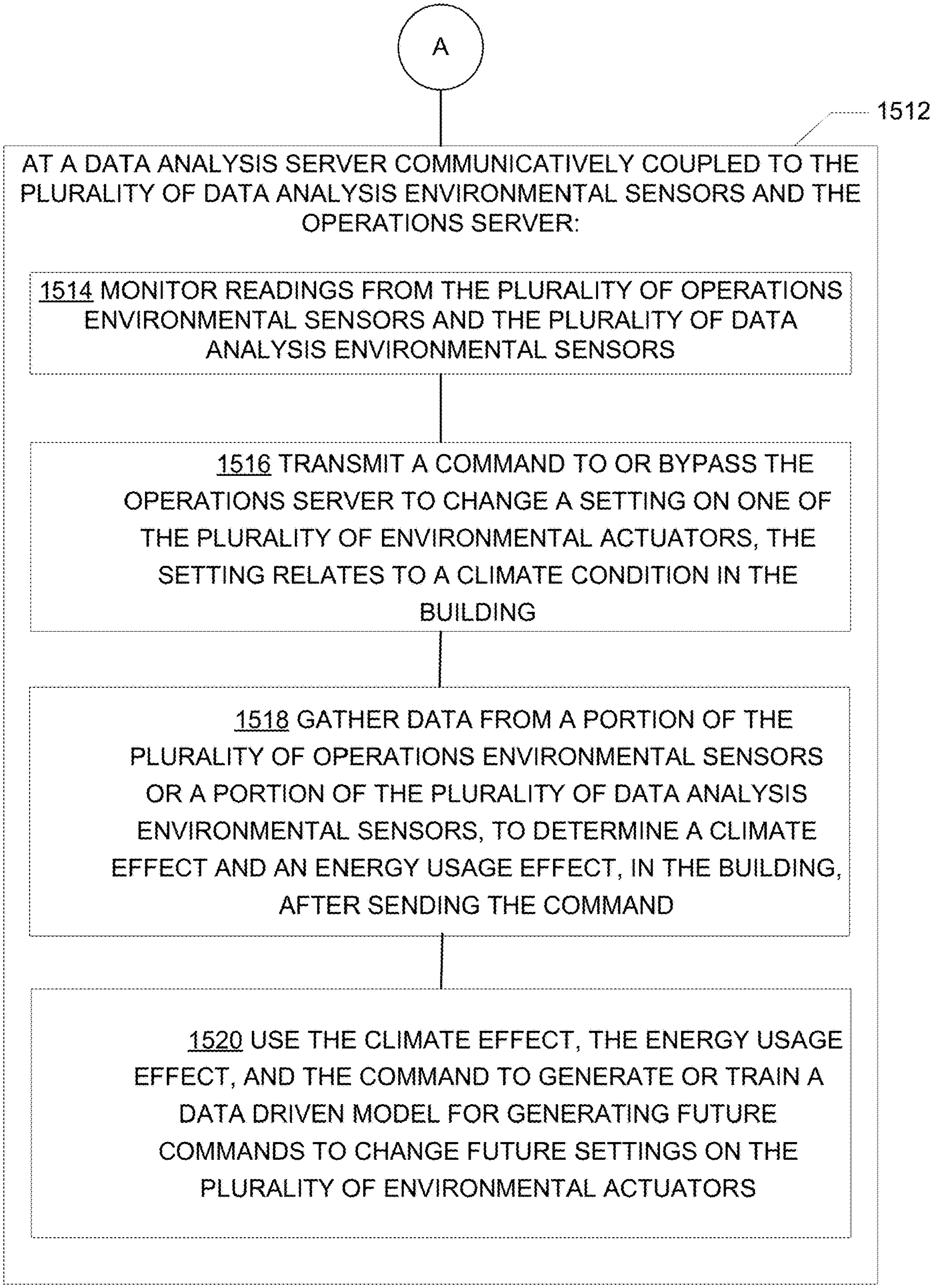

FIGS. 15A and 15B show a flowchart of an example method 1500 for environmental control in a building, according to some embodiments. The method may be performed by the system 400 (FIG. 4). The method may include, performing (1502) at an operations subsystem (e.g., the subsystem 402): at a plurality of operations environmental sensors (e.g., sensors of the physical sensors and actuators 406), measuring (1504) climate-related statistics inside or proximate to the building; and at an operations server (e.g., BAS-1), operatively coupled to a plurality of environmental actuators (e.g., actuators of the physical sensors and actuators 406), and/or transmitting (1506) commands to any of the plurality of environmental actuators to change a climate condition in the building. The commands may be issued in accordance with at least one rule. The method may also include performing (1508) at a data analysis subsystem (e.g., the subsystem 404): at a plurality of data analysis environmental sensors (e.g., sensors of the physical sensors and actuators 408), measuring (1510) climate-related statistics inside or proximate to the building; and/or performing (1512) at a data analysis server (e.g., BAS-2 or the research server 414) communicatively coupled to the plurality of data analysis environmental sensors and the operations server: monitoring (1514) readings from the plurality of operations environmental sensors and the plurality of data analysis environmental sensors; transmitting (1516) a command to the operations server to change a setting on one of the plurality of environmental actuators, the setting relating to a climate condition in the building; gathering (1518) data from a portion of the plurality of operations environmental sensors or a portion of the plurality of data analysis environmental sensors, to determine a climate effect and an energy usage effect, in the building, after sending the command; and/or using (1520) the climate effect, the energy usage effect, and the command to generate or train a data driven model for generating future commands to change future settings on the plurality of environmental actuators.

In some embodiments, the command may be a first command, and the data analysis subsystem may further include a plurality of data analysis environmental actuators, coupled to the data analysis server and confined to a separate section of the building. The method may further include, at the data analysis server: transmitting a second command to one of the plurality of data analysis environmental actuators, effective to modify a setting relating to at least one of the plurality of data analysis environmental actuators; gathering data from at least one of the plurality of data analysis environmental sensors that is present in the separate section of the building; determining a second climate effect on the separate section of the building, caused by the second command; and/or using the second climate effect, and the second command to generate or train the data driven model.

In some embodiments, the operations subsystem may further include an operations network, the operations network may use a KNX protocol.

In some embodiments, the data analysis subsystem may further include a data analysis network. The data analysis network may use a building automation and control network (BACnet) protocol.

In some embodiments, the operations network and the data analysis network may communicate via a gateway, and the gateway may translate between the KNX protocol and the BACnet protocol.

In some embodiments, the data analysis server may receive a measurement from at least one of the plurality of operations environmental sensors or from at least one of the plurality of data analysis environmental sensors, every sixty seconds.

In some embodiments, the method may further include, at an augmented reality headset, showing information from at least one of the plurality of operations environmental sensors, or from at least one of the plurality of data analysis environmental sensors, while a wearer of the augmented reality headset visually observes an inside of the building.

In some embodiments, the data driven model may include a geometric model of the building.

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described implementations. The first widget and the second widget are both widgets, but they are not the same condition unless explicitly stated as such.

The terminology used in the description of the various described implementations herein is for the purpose of describing particular implementations only and is not intended to be limiting. As used in the description of the various described implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen to best explain the principles underlying the claims and their practical applications, to thereby enable others skilled in the art to best use the implementations with various modifications as are suited to the particular uses contemplated.

What is claimed is:

1. A system for environmental control in a building, the system comprising:

- a plurality of sensors including operational sensors and data gathering sensors;
- a plurality of actuators;
- a rule-based server coupled to the plurality of sensors and the plurality of actuators, the rule-based server configured to:
  - receive operation signals from the operational sensors; and
  - control operation of the plurality of actuators according to one or more rules based on the operation signals; and
- a data-driven server coupled to the plurality of sensors and the plurality of actuators, the data-driven server configured to:

receive data signals from the data gathering sensors and the operation signals from the operational sensors;

apply one or more predictive models to the data signals and the operation signals to predict performance changes in the building due to a command; and in accordance with a determination that the performance changes meet a predetermined criteria, control operations of the plurality of actuators according to the command, wherein the data gathering sensors comprise finer-grained sensors and a more extensive set of sensors than the operational sensors, including both low-height and high-height temperature sensors, configured to detect stratification in various spaces, and low-velocity air-motion sensors configured to detect air movement and buoyancy-effect drafts throughout structure of the building as well as calibrate simulation measurements.

2. The system of claim 1, wherein the data-driven server and the rule-based server are configured to control operation of the plurality of actuators concurrently during a first time period, and wherein the data-driven server is configured to control operation of the plurality of actuators exclusively during a second time period.

3. The system of claim 1, wherein the rule-based server is configured to cease operating or to cease controlling operation of the plurality of actuators after a predetermined time period.

4. The system of claim 1, wherein the data-driven server is configured to control operation of a subset of the plurality of actuators for a zone of the building, multiple zones of the building, or the entire building, for a first time period, along with the rule-based server, and wherein the data-driven server is configured to control operation of the subset of the plurality of actuators for the zone of the building or multiple zones of the building or the entire building exclusively during a second time period.

5. The system of claim 1, wherein the data-driven server is configured to:

retrieve data points in real-time or historical trends from the data signals, the operation signals, and/or control signals;

use a machine learning model for identifying thermal dynamics and CO2 trends, based on the data points; and apply a multi-objective optimization function that optimizes indoor air quality, thermal comfort, and energy efficiency for the building, based on the thermal dynamics and CO2 trends, to predict the performance changes in the building due to the command.

6. The system of claim 1, wherein the data-driven server is further configured to:

determine if the performance changes meet the predetermined criteria by (i) simulating issuing the command to control operations of the plurality of actuators using a virtual model of the building and/or (ii) issuing the command to control operations of a portion of the building.

7. The system of claim 6, wherein the virtual model comprises buildings that are of different types and/or have different locations compared to the building.

8. The system of claim 1, further comprising:

a building monitoring database and visualization device configured to monitor and visualize performance of the building.

9. The system of claim 1, wherein the rule-based server and the data-driven server are configured on one or more restricted access secure virtual local area networks (VLANs) to prevent access from outside the building.

10. The system of claim 1, wherein the rule-based server and the operational sensors are configured to communicate via a first network, wherein the data-driven server and the data gathering sensors are configured to communicate via a second network that is separate and distinct from the first network.

11. The system of claim 10, wherein the first network is a Konnex (KNX) network and the second network is a BACnet network.

12. The system of claim 1, wherein the operational sensors comprise sensors for indoor slab and air temperatures, local zone thermostats, CO2 sensors to evaluate occupancy, and/or one or more local weather station sensors for outdoor temperature and/or rain.

13. The system of claim 1, wherein the plurality of sensors includes at least some sensors that acquire signals at different frequencies and intervals than other sensors.

14. The system of claim 1, wherein the data-driven server is configured to monitor the plurality of sensors, control one or more actuators of the plurality of actuators, store sensor data from the plurality of sensors for analysis, command heating and cooling, and/or connect to one or more external building automation systems.

15. The system of claim 1, wherein the data gathering sensors comprise BTU-sensors attached to several heating zones, tubing, manifolds, and valves to monitor distribution of heat along with fluid flows and temperatures.

16. The system of claim 1, wherein each electrical circuit in the structure is independently metered, as is each solar panel, to measure its energy usage over time.

17. The system of claim 1, wherein the data gathering sensors further comprise a redundant whole-house energy usage meter configured to monitor an aggregate of individual energy readings.

18. The system of claim 1, further comprising an augmented reality headset configured to show information from at least one of the plurality of sensors, while a wearer of the augmented reality headset visually observes an inside of the building.

19. The system of claim 18, wherein the augmented reality headset is further configured to allow the wearer to issue a hand gesture command for controlling at least one of the plurality of actuators.

* * * * *